(12) United States Patent
Esswie

(10) Patent No.: US 12,225,503 B2
(45) Date of Patent: Feb. 11, 2025

(54) ADAPTIVE PAGING IN WIRELESS COMMUNICATION NETWORKS

(71) Applicant: Dell Products, L.P., Round Rock, TX (US)

(72) Inventor: Ali Esswie, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 346 days.

(21) Appl. No.: 17/866,205

(22) Filed: Jul. 15, 2022

(65) Prior Publication Data

US 2024/0023063 A1     Jan. 18, 2024

(51) Int. Cl.
*H04W 68/02*     (2009.01)

(52) U.S. Cl.
CPC .................. *H04W 68/02* (2013.01)

(58) Field of Classification Search
CPC ................................... H04W 68/02
USPC ........................................ 370/329
See application file for complete search history.

(56) References Cited

U.S. PATENT DOCUMENTS

| | | | |
|---|---|---|---|
| 11,064,457 B2 | 7/2021 | Bolle et al. | |
| 11,228,952 B2 | 1/2022 | Ryoo et al. | |
| 11,785,668 B2 * | 10/2023 | Talebi Fard | .......... H04W 80/10 370/329 |
| 2020/0329455 A1 | 10/2020 | Ryu et al. | |
| 2023/0075197 A1 | 3/2023 | Xu et al. | |
| 2023/0171731 A1 | 6/2023 | Abedini et al. | |
| 2023/0224862 A1 | 7/2023 | Hwang et al. | |
| 2023/0284182 A1 * | 9/2023 | Shi | ....................... H04W 72/232 370/329 |
| 2024/0057032 A1 | 2/2024 | Esswie | |
| 2024/0284401 A1 | 8/2024 | Elkotby et al. | |
| 2024/0284456 A1 | 8/2024 | Elkotby et al. | |

FOREIGN PATENT DOCUMENTS

EP     3340703 A1     6/2018

OTHER PUBLICATIONS

Da Silva, et al. "Meeting 5G latency requirements with Inactive State" Ericsson Technology Review, [https://www.ericsson.com/en/reports-and-papers/ericsson-technology-review/articles/meeting-5g-latency-requirements-with-inactive-state], Jun. 19, 2019, 11 pages.

(Continued)

*Primary Examiner* — Christopher R Crompton
(74) *Attorney, Agent, or Firm* — Amin, Turocy & Watson, LLP

(57) ABSTRACT

A user equipment requests from a RAN node skipping of paging occasions that the RAN node otherwise may schedule for UEs uniformly throughout the area that the RAN serves. The RAN assigns the UE to a device-type classification based on battery parameters or service type of the UE. The RAN modifies scheduling of paging occasions to the UE, and others in a class that comprises the UE, based on the device-classification. The UE may submit to the RAN defined types of traffic, paging occasions for which the UE should not skip. The RAN may transmit in a paging skipping preemption search space an indication for the UE not to skip an upcoming configured paging occasion configured for skipping. The RAN may configure the UE with a paging pattern to use when UE conditions change, such as when an idle UE moves into range of another RAN.

20 Claims, 16 Drawing Sheets

(56) References Cited

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.
Office Action mailed Nov. 7, 2024 for U.S. Appl. No. 17/887,368, 23 pages.

\* cited by examiner

ADAPTIVE PAGING IN WIRELESS COMMUNICATION NETWORKS

BACKGROUND

The 'New Radio' (NR) terminology that is associated with fifth generation mobile wireless communication systems ("5G") refers to technical aspects used in wireless radio access networks ("RAN") that comprise several quality of service (QoS) classes, including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

NR facilitates several device classes such as high broadband devices, latency-critical/latency-stringent and reliability-critical devices, and reduced capability devices. These various classes correspond to various quality of service (QoS) requirements and corresponding various receiver complexity levels. Current wireless RAN systems facilitate different QoS coexistence (including bandwidth part adaptation) variable numerology transmissions, and dynamic link quality adaptation. These aspects may be applied to connected-mode devices, where devices have established control and data connections to the wireless network. A given wireless user equipment typically spends the majority of in an idle mode, where the UE is neither connected to nor controlled by a wireless network. Typically, to reduce device battery consumption, idle devices deep sleep for extended periods and periodically wake up and monitor a predetermined set of resources to identify if there is potential incoming traffic from the network, (e.g., devices detect and decode paging channels). Idle-mode paging procedures are agnostic to a UE's required QoS and device class. Thus, various device classes, which need different QoS targets, (e.g., different latency & reliability targets and battery capabilities), are paged using the same paging procedure, thus imposing a homogeneous power burden paging-reachability latency.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example embodiment method comprises receiving, from a first user equipment and by a communication network node comprising a processor, a first skip request message, which may be referred to herein as a first paging skipping message, that the UE uses to request skipping of paging opportunities that the RAN would otherwise have configured the UE to wake up and monitor. The method may comprise transmitting a first paging message representative of a first paging scheme to the first user equipment based on the first skip request message, wherein the first paging scheme comprises at least one first paging opportunity of a discontinuous receive cycle corresponding to the first user equipment to be skipped. The RAN may receive a portion of a first traffic flow corresponding to the first user equipment and buffer the portion of the first traffic flow until a first next paging opportunity occurs according to the first paging scheme after the at least one first paging opportunity to be skipped, and the RAN transmits, according to the first paging scheme, a first paging indication message corresponding to the portion of the first traffic flow. In other words, the RAN transmits scheduling information regarding traffic destined to the UE during a paging occasion configured in the first paging scheme but not a paging occasion that might have been otherwise scheduled for the UE if the RAN had not configured the first paging scheme for the UE.

The example embodiment method may further comprise receiving, from a second user equipment, a second skip request message, which may be referred to herein as a second paging skipping message, transmitting a first paging message representative of a second paging scheme to the second user equipment based on the second skip request message; receiving a portion of a second traffic flow corresponding to the second user equipment; buffering the portion of the second traffic flow until a second next paging opportunity after at least one second paging opportunity to be skipped according to the second paging scheme; and transmitting a second paging indication message corresponding to the portion of the second traffic flow according to the second paging scheme. The first and second skip request messages may correspond to first and second characteristics, respectively. The first characteristic may correspond to a first Quality-of-Service requirement associated with the first user equipment and the second characteristic may correspond to a second Quality-of-Service requirement associated with the second user equipment.

The first characteristic may correspond to a first device type associated with the first user equipment and the second characteristic may correspond to a second device type associated with the second user equipment. The first and second characteristics may correspond to different battery charge amounts of the first user equipment and the second user equipment, respectively.

The first user equipment and the second user equipment comprise different SIM profiles of a user device. The first paging scheme and the second paging scheme may comprise a first paging pattern and a second paging pattern, respectively, that are different from each other.

The example embodiment method may further comprise receiving a first paging-skipping preemption request from the first user equipment, wherein the paging-skipping preemption request comprises a paging-skipping preemption criterion.

The example embodiment method may further comprise receiving a portion of a third traffic flow corresponding to the first user equipment; determining that the third traffic flow satisfies the paging-skipping preemption criterion; transmitting a paging-skipping preemption indication in a paging skipping preemption search space to the first user equipment; and transmitting the portion of the third traffic flow to the first user equipment, without buffering, at a next of the at least one paging opportunity to be skipped.

An example embodiment system may comprise a system that comprises a component of a communication network node comprising a processor, the processor configured to: receive, from a first user equipment, a first skip request message; transmit a first paging scheme to the first user equipment based on the first skip request message, wherein the first paging scheme comprises at least one paging opportunity of a discontinuous receive cycle corresponding to the first user equipment to be skipped; receive a portion of a first traffic flow corresponding to the first user equipment; buffer the portion of the first traffic flow until a next paging opportunity according to the first paging scheme; and transmit a first paging indication message corresponding to the portion of the first traffic flow according to the first paging scheme. The processor may be further configured to receive, from a second user equipment, a second skip request message; transmit a second paging scheme to the second user equipment based on the second skip request message; receive a portion of a second traffic flow corresponding to the second user equipment; buffer the portion of the second traffic flow until a next paging opportunity according to the second paging scheme; and transmit a second paging indication message corresponding to the portion of the second traffic flow according to the second paging scheme. The first and second skip request messages correspond to first and second characteristics, respectively.

The processor may be further configured to receive a first paging-skipping preemption request from the first user equipment, wherein the paging-skipping preemption request comprises a paging-skipping preemption criterion. The processor may be further configured to receive a portion of a third traffic flow corresponding to the first user equipment; determine that the third traffic flow satisfies the paging-skipping preemption criterion; transmit a paging-skipping preemption indication to the first user equipment; and transmit the portion of the third traffic flow to the first user equipment, with buffering, or without buffering, at a next of the at least one paging opportunity to be skipped.

In an example embodiment, a non-transitory machine-readable medium comprises executable instructions that, when executed by a processor of a user equipment coupled with a first communication network, facilitate performance of operations, that may comprise determining, by the user equipment, a first skip request message based on a characteristic associated with the user equipment; transmitting the first skip request message to a first node component of the first communication network; receiving a first paging scheme based on the first skip request message, wherein the first paging scheme comprises at least one paging opportunity of a discontinuous receive cycle corresponding to the first user equipment to be skipped; and receiving a portion of a first traffic flow corresponding to the first user equipment according to the first paging scheme.

The characteristic may correspond to a QoS requirement associated with the user equipment. The user equipment may be configured to communication with the first node component of the first communication network and a node component of a second node component of a second communication network, and the at least one paging opportunity of the discontinuous receive cycle corresponding to the first user equipment to be skipped may be associated with the second communication network.

The operations performed may further comprise transmitting a paging-skipping preemption request to the first node component of the first communication network, and wherein the paging-skipping preemption request comprises a paging-skipping preemption criterion. The operations may further comprise receiving a paging-skipping preemption indication from the first node component of the first communication network; and receiving a second traffic flow at a next of the at least one paging opportunity to be skipped based on the paging-skipping preemption indication.

In yet another example embodiment a method comprises monitoring, by a first component of a first communication network node comprising a processor and located within a first paging area, a metric corresponding to a wireless communication parameter; and transmitting, to a first user equipment that is configured with a first defined paging scheme, a second paging scheme indication corresponding to a second defined paging scheme to be used by the first user equipment based on a first change of the metric. The metric may comprise an indication of a traffic type change. The metric may comprise an indication that the first user equipment has moved to an area covered by a different RAN which will within the first paging area. The wireless communication parameter may comprise at least one of: a characteristic of data traffic to be transmitted from the component to the first user equipment, a capacity of a paging resource available to the component, a device type associated with the user equipment, or a battery charge status of the user equipment.

The example embodiment method may further comprise transmitting, to the first user equipment, a third defined paging scheme that is different from the first defined paging scheme or different from the second defined paging scheme based on a second change of the metric. The second paging scheme may be transmitted in an Early Paging Indication message.

The example embodiment method may further comprise configuring the first user equipment to use a default paging scheme when the first user equipment moves within the first notification area. The second paging scheme may comprise the default paging scheme.

The example embodiment method may further comprise transmitting, with a second component of a second wireless communication network node that is part of the first notification area, a third paging scheme to the user equipment after the user equipment attaches to the second component.

The first user equipment may be part of a first group associated with a first group characteristic and a second user equipment may be part of a second group associated with a second group characteristic, wherein the second defined paging scheme may be different from a third paging scheme corresponding to the second group, and wherein the second and third paging schemes share a paging opportunity.

In an example embodiment, a system comprises a computer executable component of a first wireless communication network node comprising a processor within a first paging area, the processor configured to monitor a metric corresponding to a wireless communication parameter; and transmit, to a first user equipment that is configured with a first defined paging scheme, a second paging scheme indication corresponding to a second defined paging scheme to be used by the first user equipment based on a first change of the metric.

The wireless communication parameter may comprise one of: a characteristic of data traffic to be transmitted from the computer executable component to the first user equipment, a capacity of a paging resource available to the computer executable component, a device type associated with the user equipment, or a battery charge status of the user equipment.

The processor may be further configured to transmit, to the first user equipment, a third defined paging scheme that is different from the first defined paging scheme or the second defined paging scheme based on a second change of the metric.

The second paging scheme may be transmitted in an Early Paging Indication message.

The processor may be further configured to configure the first user equipment to use a default paging scheme when the first user equipment moves within the first notification area.

The first user equipment may be part of a first group associated with a first group characteristic and a second user equipment may be part of a second group associated with a second group characteristic, wherein the second defined paging scheme is different from a third paging scheme corresponding to the second group, and wherein the second and third paging schemes share a paging opportunity.

In yet another embodiment a non-transitory machine-readable medium comprises executable instructions that, when executed by a processor of a node of communication network, facilitate performance of operations, comprising: monitoring a metric corresponding to a wireless communication parameter; and transmitting, to a first user equipment that is configured with a first defined paging scheme, a second paging scheme indication corresponding to a second defined paging scheme to be used by the first user equipment based on a first change of the metric. The wireless communication parameter comprises one of: a characteristic of data traffic to be transmitted from the node to the first user equipment, a capacity of a paging resource available to the node, a device type associated with the user equipment, or a battery charge status of the user equipment.

The operations may further comprise transmitting, to the first user equipment, a third defined paging scheme that is different from the first defined paging scheme or the second defined paging scheme based on a second change of the metric.

The operations performed may further comprise configuring the first user equipment to use a default paging scheme when the first user equipment moves within the first notification area.

The first user equipment may be part of a first group associated with a first group characteristic and a second user equipment may be part of a second group associated with a second group characteristic, wherein the second defined paging scheme is different from a third paging scheme corresponding to the second group, and wherein the second and third paging schemes share a paging opportunity.

The first user equipment may be part of a first group of user equipment members, and wherein the second paging scheme is transmitted to members of the group.

DETAILED DESCRIPTION OF THE DRAWINGS

Figure 1:
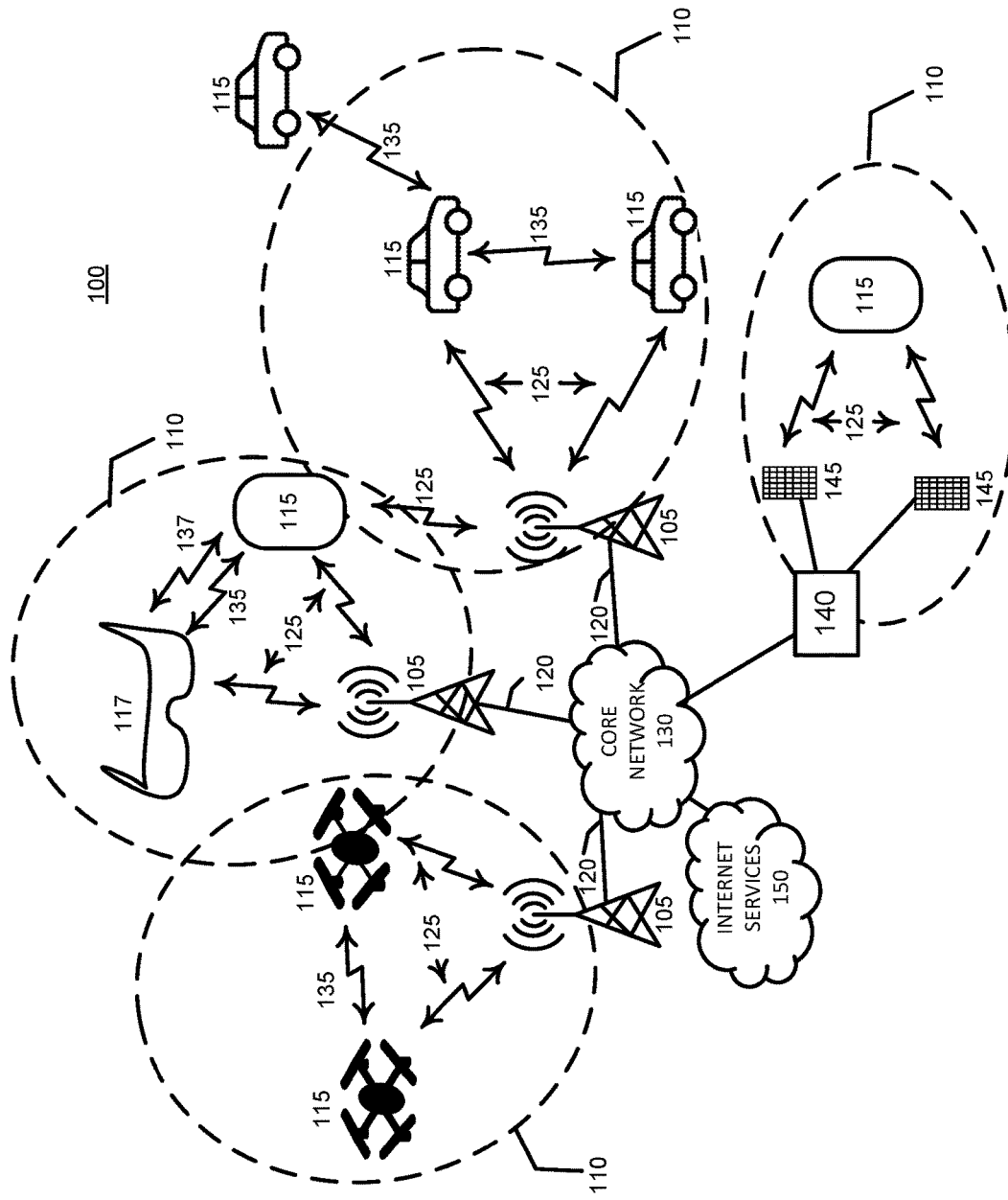
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Cellular devices are mostly in the idle mode, neither controlled by nor connected to a communication network. During the idle mode time, devices are typically configured to deep sleep, e.g., shut down their RF transceiver chains, for extended periods of time, and only periodically wake up, and monitor predetermined channel resources for paging indications. Communication networks transmit paging indications towards idle-mode devices, carrying information on which one or more of the idle-mode device(s) have an incoming traffic arrival. In response, UEs wake up and establish connection the network that transmitted the paging indication, e.g., transition from idle to connected state.

A latency-critical idle-mode device needs to be reached from the network much faster than a broadband device. Such idle-mode reachability latency is the delay from the moment the network has a payload arrival for an idle-mode device until the UE becomes aware of such information and transitions to a network-connected state for payload reception. Current NR paging design can minimize paging reachability delay at the expense of significant control resource overhead and increased battery consumption, for all idle-mode devices. For example, configuring more frequent paging resources, e.g., to facilitate faster device reachability, leads to all idle-mode devices waking up more frequently and thus, consuming more power (which is not suitable for power-limited sensor devices for instance) as well as increasing network resource overhead used for transmitting control paging indications, if available.

Network paging overhead. Paging signaling comprises control information the delivery of which to a UE does not result in revenue to mobile network operators ("MNO") that operate one or more wireless communication networks. Paging overhead should be minimized as much as practicable. A RAN node defines a certain limited set of paging opportunities, which should carry all paging messages for all UE devices in communication with the RAN. In case of many idle mode UE devices, paged simultaneously, the RAN node can prioritize a sub-set of paged devices for paging transmission during the corresponding dedicated paging occasions while buffering the paging transmissions for others over the next available dedicated paging occasions.

Paging reachability delay is generally defined a period beginning when a RAN node receives a paging trigger for an idle mode device until the idle mode device becomes aware of the paging trigger transitions from an idle to a connected state. Currently, paging delay is not adaptive to the requirements of the idle mode devices. For example, idle mode devices can only have a single paging occasion withing the configured RAN or UE paging DRX cycle, which typically results in at least an approximate 10 ms of paging reachability latency across of device classes of idle mode UEs.

Paging monitoring, detection, and decoding is a power-inefficient process at the idle mode devices. Idle mode devices wake up periodically to detect the paging messages. It is vital, for device power efficiency, to reduce the amount of paging information received by the device, and frequency of waking up periods, specifically for power-limited devices such as sensors, wireless actuators, etc.

Unlike some resource procedures in connected-mode, NR idle-mode paging procedures are independent from the paged devices' classes, and paging-triggering services. In other words, all devices are essentially treated equally regardless of their target QoS requirements, latency criticality, and battery charge state or capability. Thus, embodiments, aspects, features, and concepts of adaptive and QoS-aware paging are disclosed herein that may tailor paging to a particular device type or traffic flow type.

In an adaptive paging embodiment, channel resources and number of paging resource opportunities within a device's awake period are associated with services triggering the paging, paged device classes, or their associated battery capability. Idle-mode devices that need a stringent reachability latency may be configured with multiple dedicated paging opportunities withing each wake up period, while idle-mode devices for which power use efficiency is more important than immediate reachability may configured by dedicated paging cycle and resources (or paging pattern/scheme) such that the period of deep sleeping is maximized.

Thus, paging overhead and performance is allocated for QoS-stringent idle-mode devices but not for devise for which minimizing power usage is a primary concern.

In a dynamic paging skipping embodiment, paging resources are optimized for idle-mode devices of differing processing capabilities. There are cases when an idle-mode device requires paging skipping, e.g., a UE does not monitor one or more paging opportunities for battery and/or processing limitation reasons. For example, a multi-sim device, with a single RF chain, may monitor channels of one network while disregarding simultaneous monitoring of another network. In such a scenario, paging performance of the disregarded network may be negatively impacted. For example, a network's resources used to transmit paging indications to a multi-SIM device may be wasted because the device is not disregarding monitoring of the paging resources. By informing the disregarded network the idle-mode device SIM is skipping one or more of its dedicated paging opportunities the disregarded network, upon arrival of a payload for the disregarding device, may buffer the paging information and halt the paging transmission until the first available paging opportunity after the skipping/disregarding period, and thus, not impact the network paging performance experienced by other devices that are connected to the network. To facilitate buffering and holding of paging indications to an idle-mode device, the idle-mode device may transmit towards the network a paging skipping period or a number of next paging opportunities that the device will not be monitoring.

In a dynamic paging preemption embodiment, a RAN may change a paging configuration configured in a UE. Instead of being service-agnostic, meaning that devices are always paged for all types of incoming traffic and associated paging-triggering services, updated paging patterns, or schemes may facilitate different awakening patterns to receive pages at a given UE. Such updated paging pattern's/scheme may facilitate idle-mode devices reducing power consumed monitoring, detecting, and (blindly) decoding paging resources. Thus, idle-mode devices may be interested in skipping paging monitoring and detection for a configured period, except for a determined set of paging triggering services. For example, a power-limited device or sensor may desire to skip paging monitoring for regular updates until its battery is recharged, except for paging indications of traffic related to emergency updates/services. The paging preemption scheme disclosed herein facilitates power-limited or processing-limited devices to skip paging monitoring except for a set of configured services, where the paging skipping is preempted/instantly interrupted upon availability of a configured service(s) of interest.

Ideally, a user equipment in idle or inactive mode deep sleep (e.g., shut down transceiver circuitry of the UE) if there is not incoming traffic or services for them. However, for UEs that are deep sleeping to get become aware of incoming downlink payload, the idle/inactive UEs are configured with a periodic set of occasions within determined paging radio frames, where an idle and inactive UE should periodically wake up, monitor, and determine if there is a paging indication destined for the UE.

Specifically, in RRC IDLE/INACTIVE mode, before the conception of novel aspects, concepts, features, and embodiments disclosed herein, UEs have been configured to continuously wake up, according to the configured paging cycle, in order to check if a single/multiple UEs are being paged in the current paging occasion. Before the disclosure of the novel aspects, concepts, features, and embodiments disclosed herein, UEs follow three broad activities before transitioning to RRC CONNECTED state to enable paging.

As UEs may be out of sync with the radio interface, due to a long sleep period, UEs attempt re-synchronizing with the NR radio RAN interface by detecting at least a single synchronization signal block ("SSB"). Different UEs, with different implementations (from various UE vendors) may be configured for a different number of SSB s/radio sequences before they get in full sync with the network. For instance, UEs experiencing good signal-to-interference-noise-ratio ("SINR") conditions may be able to re-synchronize with the radio network by detecting a single SSB/sequence; although, UEs experiencing poor SINR conditions may require additional SSB instances.

After UEs are in full sync with the RAN, UEs attempt to blindly decode paging downlink control information (DCI), sent on possible PDCCH occasions that may have been pre-configured by higher layers. Blind decoding is a power consuming operation because the device is not yet connected to the network, and thus is unaware of paging transmission configurations such as MCS, coding scheme, etc., and accordingly, UEs blindly attempt all different decoding possibilities of the paging DCI. The paging DCI implies an indication to the idle/inactive UEs that there is at least a single UE with incoming traffic in the downlink direction. In case there is NO paging DCI detected over the PDCCH resources, idle/inactive UEs assume that there is no paging in the current paging opportunity, and thus return to sleep mode until a next paging occasion.

If an idle/inactive UE detects the presence of a paging DCI during a paging occasion, the UE typically decodes a subsequent physical downlink shared channel ("PDSCH") data resources to read a paging record therefrom. The paging record is an indication of an identifier, or identifiers, of an idle/inactive UE, or UEs, that is/are getting paged. From the perspective of a UE, if the paging record contains an identifier corresponding to the UE, the UE triggers a random-access procedure to switch to the RRC CONNECTED state.

Achieving acceptable paging performance has been associated with multiple tradeoffs. For example, the higher the frequency, or inverse of paging periodicity, of a paging occasion and paging DCI the less packet buffering delay and minimized device reachability delay. Thus, more frequent paging typically results in better paging performance. However, the more a UE wakes up the more power it uses. For a UE device that has a stringent power-use budget (e.g., an M2M devices that is powered by one or more small batteries that are not recharged), waking up more frequently and blindly decoding paging occasions just to determine that there is not a DCI directed to the UE needlessly wastes scarce battery charge of the UE, which shortens the useful life of the device, or at least shortens the time until a battery replacement. In addition, more frequent paging corresponds to consumption, or 'tying-up,' of the PDCCH control channel capacity. More frequent paging DCIs uses a larger size of the PDCCH control resource set (e.g., CORESET), and thus less PDCCH resources remain available for carrying other control and scheduling information, and overall, and less bandwidth part resources are available for data transmissions over the PDSCH.

Aspects, concepts, features, and embodiments disclosed herein facilitate more flexibility in paging than current paging procedures provide, which aspects, concepts, features, and embodiments disclosed herein optimize paging performance and power saving gain at UEs while not overloading the network resources by downlink control information.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a nonstandalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MGM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel dements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 15 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 10 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth according to narrowband communications), or a combination of these techniques. For example, some UEs 115 may be configured for operation using narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include, private communication or group communication and may be supported by one or more mission critical services such as mission critical push-to-talk (MCPTT), mission critical video (MCVideo), or mission critical data (McData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPS). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum hands, devices such as base stations 105 and UEs 115 may employ carrier sensing for collision detection and avoidance. In some examples, operations in unlicensed bands may be based on a carrier aggregation configuration in conjunction with component carriers operating in a licensed hand (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting, IMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude onsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
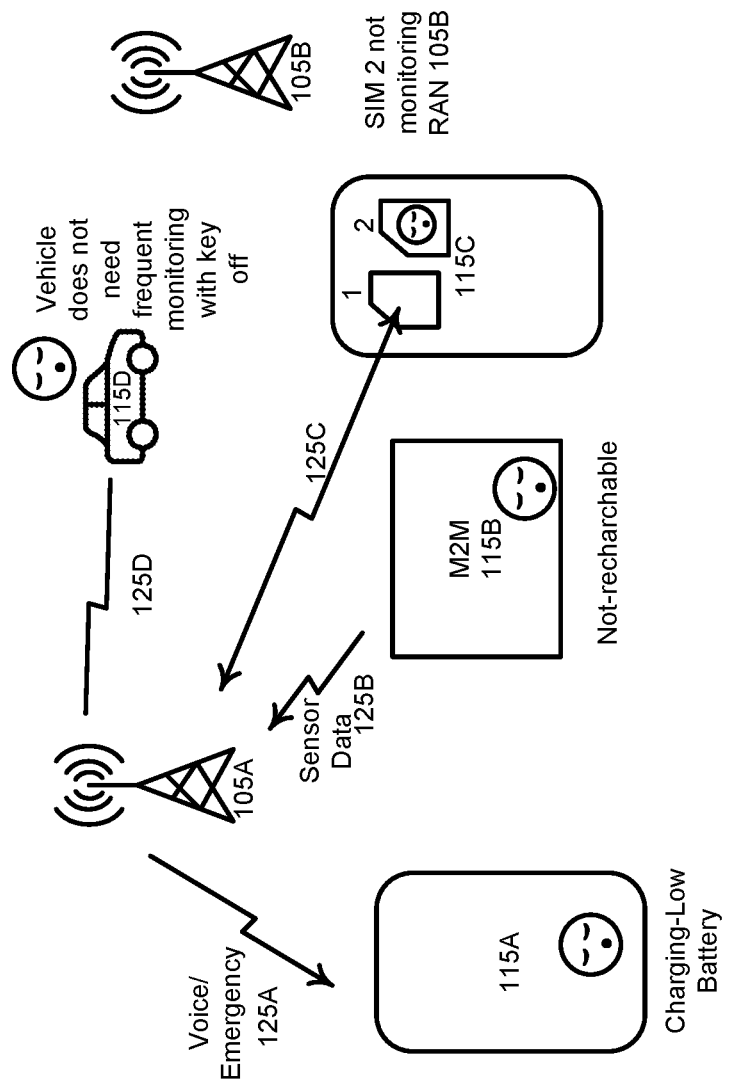
FIG. 2 illustrates example user equipment types with different idle mode paging schemes.

Turning now to FIG. 2, the figure illustrates a variety of user equipment. UE 115A comprises smart phone that is low on battery charge and is plugged in for charging and is in a sleep mode but is configured to only monitor for paging opportunities for communications that may be associated with a desirability for low, or no, reachability delay, such as, for example, an incoming voice call or an emergency alert broadcast. Thus, wireless link 125A between UE 115A and RAN 105A is shown with an arrow pointing only in the downlink direction. UE 115B comprises a machine-to-machine device that may be powered only by a battery with no regular recharging, so batter charge preservation is a high priority. Thus, UE 115B is shown in a sleep mode with link 125B showing an arrow only in an uplink direction to indicate that the primary purpose of UE 115B is to occasionally transmit sensor data in an uplink direction. UE 115B may also receive downlink transmission, for example configuration information or software updates, but the primary mission of UE 115B is to transmit sensor data thus link 125B only shows data transmission in the uplink direction. UE 115C comprises a smartphone that comprises two SIM profiles, profile 1 and profile 2. In the example, UE 115C has a single radio circuit so even the UE comprises two different SIM profiles, communication occurs with only one or the other of RAN 105A or 105B. Thus, link 125C is shown with an arrow pointing in both uplink at downlink directions to signify an active link for SIM 1, but no link is shown for sleeping SIM 2 to indicate that there is not an active radio session with RAN 105B. UE 115D comprises a communication device in a vehicle, such as a telematics communication device, that may be configured to only communicate with the vehicle is in a 'key-on' mode (e.g., the vehicle is not turned off). Thus, link 125D is shown with no arrow in either uplink or downlink directions to indicate that the vehicle is in a sleep mode while the vehicle is in a key-off mode and is not active with RAN 105A to preserve vehicle battery charge, much like with M2M UE 115B, but to also indicate that the vehicle may wake up from sleep mode occasionally to upload data, much like M2M UE 115B, or that when the vehicle is started (e.g., key-on mode) link 125 will typically be activate.

Figure 3:
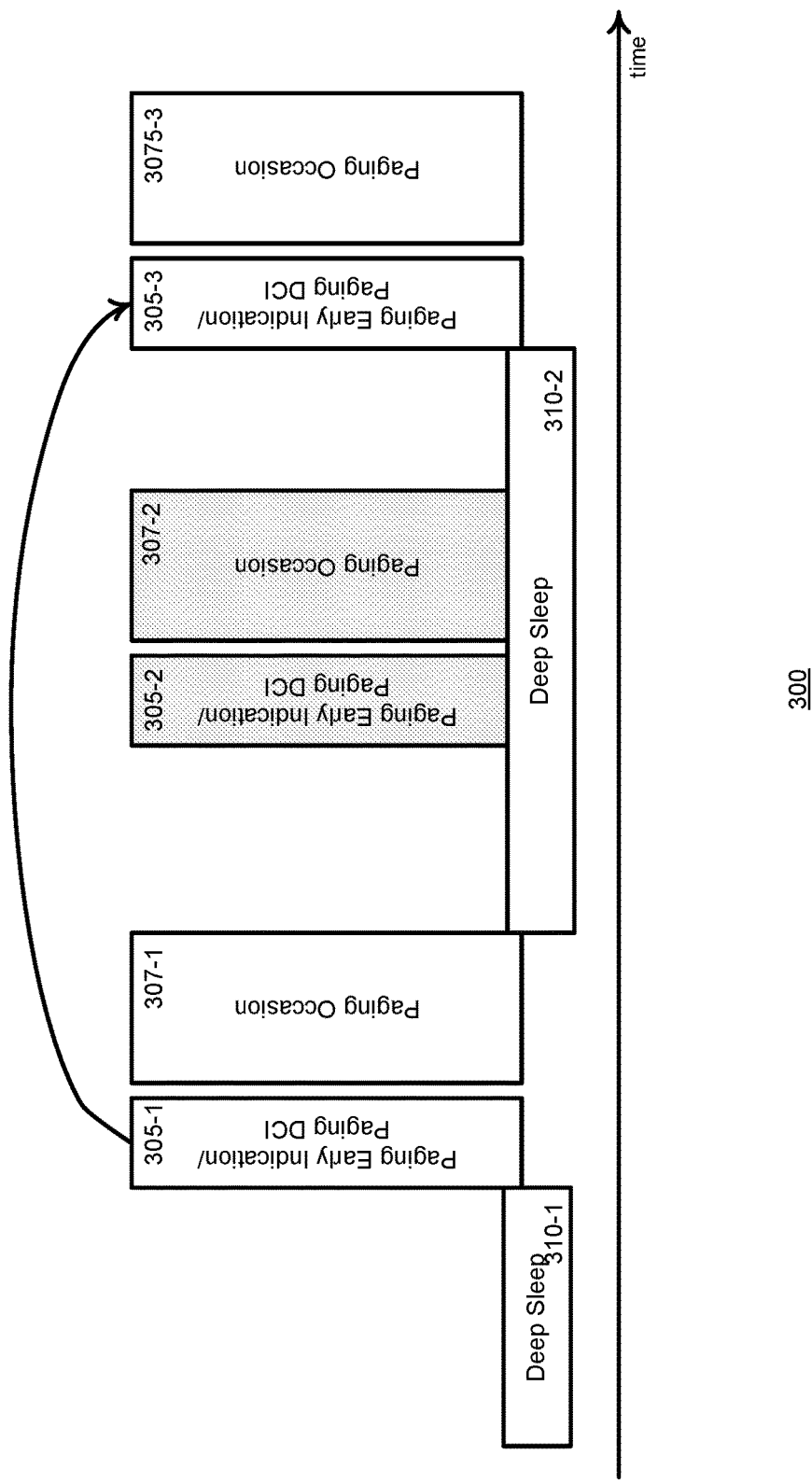
FIG. 3 illustrates a diagram of an example skipping a paging opportunity in a paging scheme.

Turning now to FIG. 3, the figure illustrates a paging pattern schemes that configures a UE to sleep during a paging frame. The UE wakes up from deep sleep period 310-1 and monitors and decodes Early Paging Indication ("EPI") 305-1, which may comprise information instructing the UE to 'skip', or enter deep sleep period 310-2 during, EPI 305-2 and paging occasion 307-2, and to wake up to monitor EPI 305-3. It will be appreciated that EPI 305-1 or EPI 305-2 may, or may not, include indications to monitor paging occasions 307-1 or 307-3, respectively. Thus, the UE need not use battery power to perform time-frequency synchronization to monitor paging occasion 307-2, and perhaps not even paging occasions 307-1 or 307-3.

In an example embodiment, enabling a dynamic paging skipping procedure may facilitate a single-SIM UE and/or multi-SIM UE, connected to a network A and configured to monitor paging resources of a different network B, to determine paging opportunities, or occasions, to be skipped corresponding to the different network B based on a device priority, or based on a device class of the UE, which device class may be based on a type of traffic, and, based on network configurations, and determined battery consumption requirements or battery charge or the UE. The UE may transmit a paging skipping request to network B, indicating a desired number of upcoming paging occasions to be skipped from monitoring of paging occasions from network B, thus, saving battery level and device capability for ongoing session over network A, or for further extending a deep sleep period. The UE may receive a paging skipping indication from network B, including the number of upcoming paging occasions for the corresponding device class/priority. The UE skips monitoring the configured number of upcoming paging occasions. On condition of a new paging trigger/indication, arriving at the RAN node of network B during the configured paging skipping period, the RAN node may buffer and hold transmission of the paging indication until the next available paging occasion after the configured paging skipping period.

Several paging device classes may be defined, to one or more of which an idle mode device may be associated. Examples of the defined paging device classes includes, but not limited to: URLLC, eMBB, power-limited, power-non-limited, multi-SIM, single-SIM, IIoT Ultra-low-power, or a default paging device class.

Idle mode devices that share a common device characteristic, for example power capability, RF capability, or traffic profile, may be classified as belonging to a certain paging device class, or simply device class. RAN nodes and/or core network/AMF may exchange device-class-based paging indications. That is, each of the RAN-triggered and/or core-triggered paging pattern, or scheme, may be associated with a certain defined device class. This facilitates RAN nodes in applying apply different paging policies among different device classes, idle mode devices belonging to which have different paging performance (e.g., paging power consumption, paging latency, paging overhead) depending on the paging device class they belong to.

As shown in FIG. 3, a RAN node may transmit a paging skipping indication 305-1, as part of the EPI, paging DCI (e.g., paging in PDCCH), or a paging record (e.g., paging PDSCH). The paging skipping indication may include information of the following: One or more paging device classes over which the transmitted paging skipping is applied, or a paging skipping period in terms of a skipping timer or period (e.g., given in milliseconds) and/or the number of the next paging occasions for a UE to skip monitoring. EPI 305-2 and paging occasion 307-2 are shown in light grey to indicate that they are skipped according to information received in EPI 305-1. Thus, the UE sleeps during period 310- instead of monitoring and attempting to decode EPI 305-2 and paging occasion 307-2 and wakes up to monitor and decode EPI 305-3. The idle mode UEs, receiving paging skipping indication, skip waking up and monitoring the determined number or period(s) of paging skipping.

Transmitted paging skipping indication can be scrambled in several ways. In one way, a paging skipping indication may be scrambled with the same scrambling code an EPI DCI and/or a paging DCI, which can be associated with either a paging group of UEs or sub-group within a certain paging group. For example, the UE and/or UEs in certain device class, which belongs to a certain paging group with a certain scrambling code/sequence assignment, may be configured to decode a current paging indication/DCI alongside with potential paging skipping configurations (to be applied over future paging occasions) simultaneously with the same code. The disadvantage of this option is that for transmitting a paging skipping indication towards a paging device class of devices that belong to various UE paging groups, the network transmits a repetition of the paging skipping indications during all paging occasions of the idle mode UEs of interest, increasing the paging overhead.

In another way of scrambling a paging skip indication, a paging skipping indication may be transmitted with a device-class-specific scrambling code over a dedicated or shared search space and/or resources dedicated for the group/class. Idle mode UEs, belonging to a given paging device class, monitor the corresponding DCI search space and/or sequence transmissions of the associated paging skipping indications. This way, idle mode UEs classified in several paging device groups/classes may monitor the same paging skipping indication, and accordingly, reduce average device power consumption and network overhead.

A paging skipping indication can be in the form of a downlink control information (DCI) with associated configured search space and/or sequence structure and identifiers. Thus, in case there is congestion of paging resources due to increasing paging rates, the RAN node may skip transmitting one or more of the lower-priority paging indications, DCI, and records (e.g., lower priority paging occasions), for one or more of the UE paging device classes. Accordingly, the RAN node may transmit a paging skipping indication during a current paging occasion. Furthermore, the RAN node may receive a downlink packet arrival, and accordingly a corresponding RAN/core paging trigger, for one or more UEs of paging groups for which the RAN node has formerly transmitted a paging skipping indication. In such case, the RAN node may buffer the paging indication for the one or more UEs until the former paging skipping validity period has expired. After expiration of the paging skipping validity period, the RAN node transmits the buffered paging indication/DCI/sequence towards the intended UEs over their originally configured paging occasions. To avoid a paging escalation over the entire radio notification area, the RAN node may send a paging hold indication over the backhaul links (e.g., XN/F1 interfaces) to a neighboring RAN node within the same RAN-based Notification Area ("RNA") and/or back to the core network (e.g., an AMF). The paging hold indication signals surrounding RAN nodes of the RNA to delay/hold the paging transmission/escalation for the paged one or more UE identifier(s) because the paging-hold-indication-transmitting RAN node has configured a paging skipping indication for the associated paging device classes/group(s). This is facilitates avoiding having the RAN/core interface unnecessarily escalating paging due to the UEs not responding to the paging indication even though one or more of the RAN nodes have formerly configured a paging skipping for the paging groups associated with the paged UE(s).

In an embodiment, idle/inactive mode UEs may determine and transmit to a RAN a number of desired paging occasions (and/or period of time and/or paging timer) to be skipped from monitoring. The RAN node responds by transmitting a paging skipping indication associated with and/or scrambled with the device class and/or paging priority. In an aspect, the RAN transmits the number of the upcoming paging occasions and paging frames to be skipped by the indicated UE paging group(s), and/or paging classes, in another aspect the RAN transmits an expiry timer period, in terms of milliseconds, for example, a number of slots, a number of subframes, and/or system frame numbers over which the indicated UE paging device classes are to skip monitoring and detecting the paging occasions. In yet another aspect, the RAN transmits a defined set of paging occasion patterns that are configured for and signaled to, idle/inactive mode UEs using system information signaling. A paging skipping indication may comprise an index of a paging occasion pattern to be monitored by the indicated UE paging groups starting from the next paging occasion, as well as a paging pattern/scheme validity period (timer) indication over which the new paging pattern is applicable. When the validity timer expires, UE members of the indicated UE paging group monitor and blindly decode the paging occasion set indicated in an original paging cycle and previously assigned UE-identifiers (e.g., I-RNTIs).

In an embodiment from the perspective of a single-SIM, or a multi-SIM, WTRU/UE, a UE determines a number of paging occasions to be skipped (or a paging skipping duration), based on, among other parameters, battery consumption, battery charge, RF capability, or processing capability. The UE transmits a paging skipping request to a selected RAN node. The UE receives in signaling from the RAN a paging skipping indication and blindly decodes the paging skipping indication. The UE determines a configured number and/or a period of skipping paging occasions, and assigned paging class information, based on the indication received in the RAN signaling, including paging skipping format (DCI or sequence), and search space information. The UE skips monitoring the determined paging occasions, or paging occasions over during the determined skipping period and overwrites previous paging occasion settings (e.g., based on UE identifiers or paging cycle). The UE may resume monitoring the paging occasions after the configured paging skipping period expires.

In an embodiment from the perspective of a RAN node, the RAN node transmits paging skipping information as part of a master information block ("MIB") and/or as part of a system information block ("SIB"). The RAN node receives a number or period of skipping paging occasions, as part of random access preamble information, and/or RRC connection establishment signaling. The RAN node transmits paging-class information towards idle mode UEs that may include associated paging skipping DCI search space and/or sequence list. The RAN node transmits paging skipping indication DCI/sequence associated with one or more paging device classes. On condition of receiving paging indication from core network 130 (shown in FIG. 1) or a RAN node for a UE during the UEs configured paging skipping duration, the RAN node may transmit via on backhaul interfaces Xn/F1 a paging hold indication including a paging indication holding period. The RAN node buffers the received paging indication and transmits it during the next available paging occasion of the paged UE after the paging skipping period expires.

Figure 4:
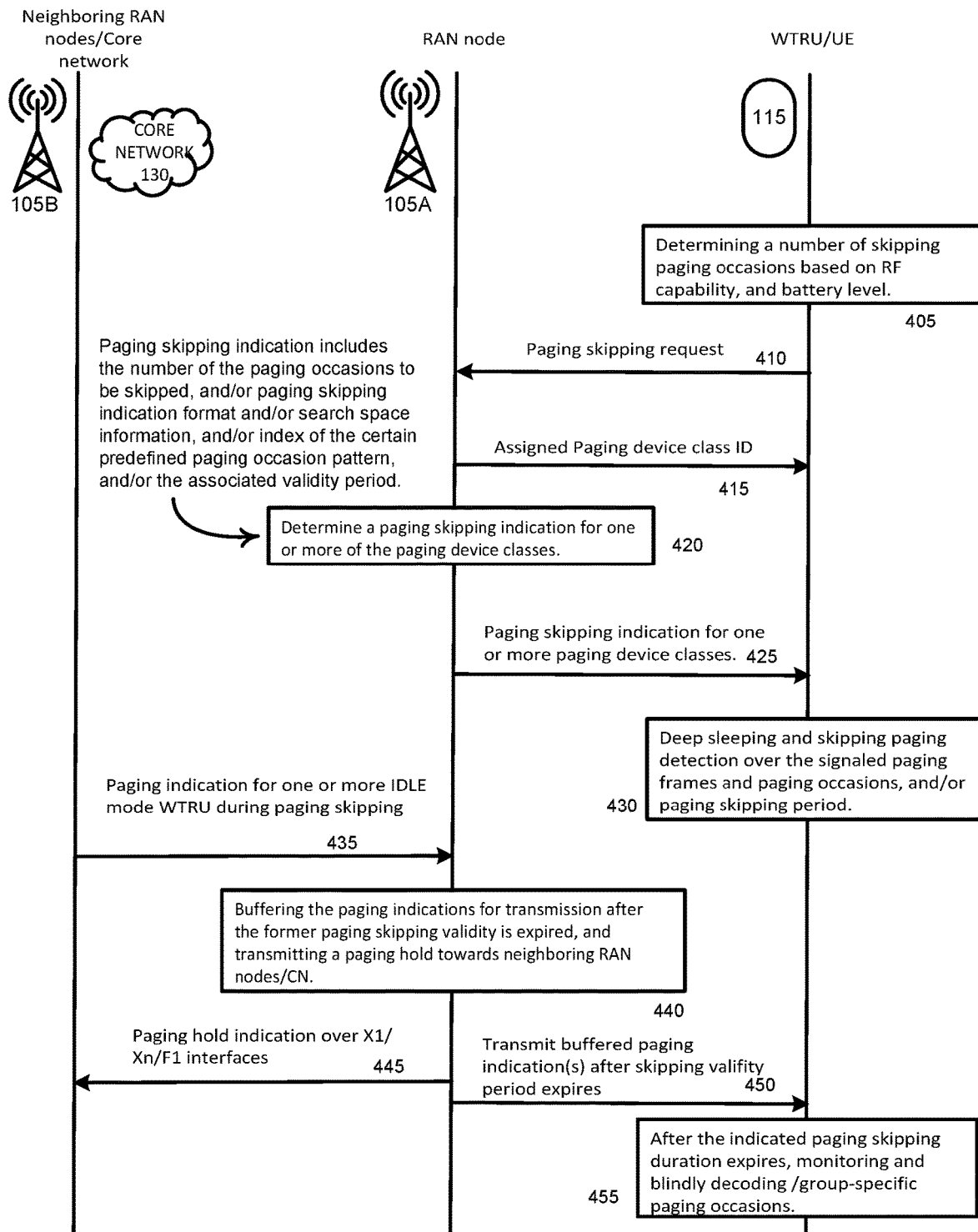
FIG. 4 illustrates a timing diagram of an embodiment method of skipping paging opportunities.

Turning now to FIG. 4, the figure illustrates a timing diagram of an embodiment method 400 for implementing paging skipping based on device classification of one or more UEs. At step 405 UE 115 may determine a number of paging occasions to skip based on RF capability, processing capability, battery charge level, battery power limit, or other parameters. At step 410 the UE transmits to RAN 105A a paging skipping request message that may comprise a number of paging opportunities to skip, or a paging skipping validity period over which paging should be skipped. At step 415 RAN 105A may transmit back to UE 115 an assignment of a class identifier to the UE. The class identifier may correspond to a classification of devices based on RF capability, processing capability, battery charge level, battery power limit, or other parameters. Thus, paging skipping patterns, or schemes, applied by RAN 105A to the class of devices associated with the classification identifier transmitted in step 415 may preclude paging opportunities, or occasions, from including paging information for UE 115, or for other UEs associated with the classification identifier transmitted at step 415.

At step 420 ran node 105A may determine paging skipping information for one or more paging devices. The paging skipping information may include a number of paging occasions to be skipped by UE 115 and other UEs that may have been assigned the device classification identifier transmitted to UE 115 at step 415, a paging skipping indication format, search space information, an index of a certain predefined paging occasion pattern, or scheme, or an associated paging skipping validity period. RAN 105A transmits the determined paging skipping information at step

425. At Step 430 UE 115 receives the paging skipping information, enters a sleep mode, and skips paging detection during paging frames and paging occasions according to indications in paging information transmitted at step 425.

At step 435 paging information for one or more idle mode UEs, such as UE 115, that are associated with the paging device class identifier transmitted to UE115 at step 415, may be transmitted from RAN node 105B, or from core network 130, to RAN node 105A. At step 440 RAN node 105A may receive and buffer the paging indication information transmitted from RAN node 105B at step 435. The paging indication information may be buffered at RAN node 105A until the paging skipping validity period expires. At step 440 ran node 105 may also determine a paging hold message to transmit to RAN node 105B or to core network 130. The paging hold information may instruct RAN 105B to refrain from transmitting more paging indication information to UE 115, or other UEs of the determined device class, until the paging skipping validity period expires, and the paging hold information may be transmitted to RAN 105B/core network 130 via X1, Xn, or F1 interfaces at step 445. After the paging skipping validity period expires, RAN node 105A may transmit the paging indication information that was transmitted at step 435 to UE115 at step 450. After the paging skipping validity period expires, UE115 may resume monitoring and blindly decoding configured paging occasions without skipping paging occasions.

Figure 5:
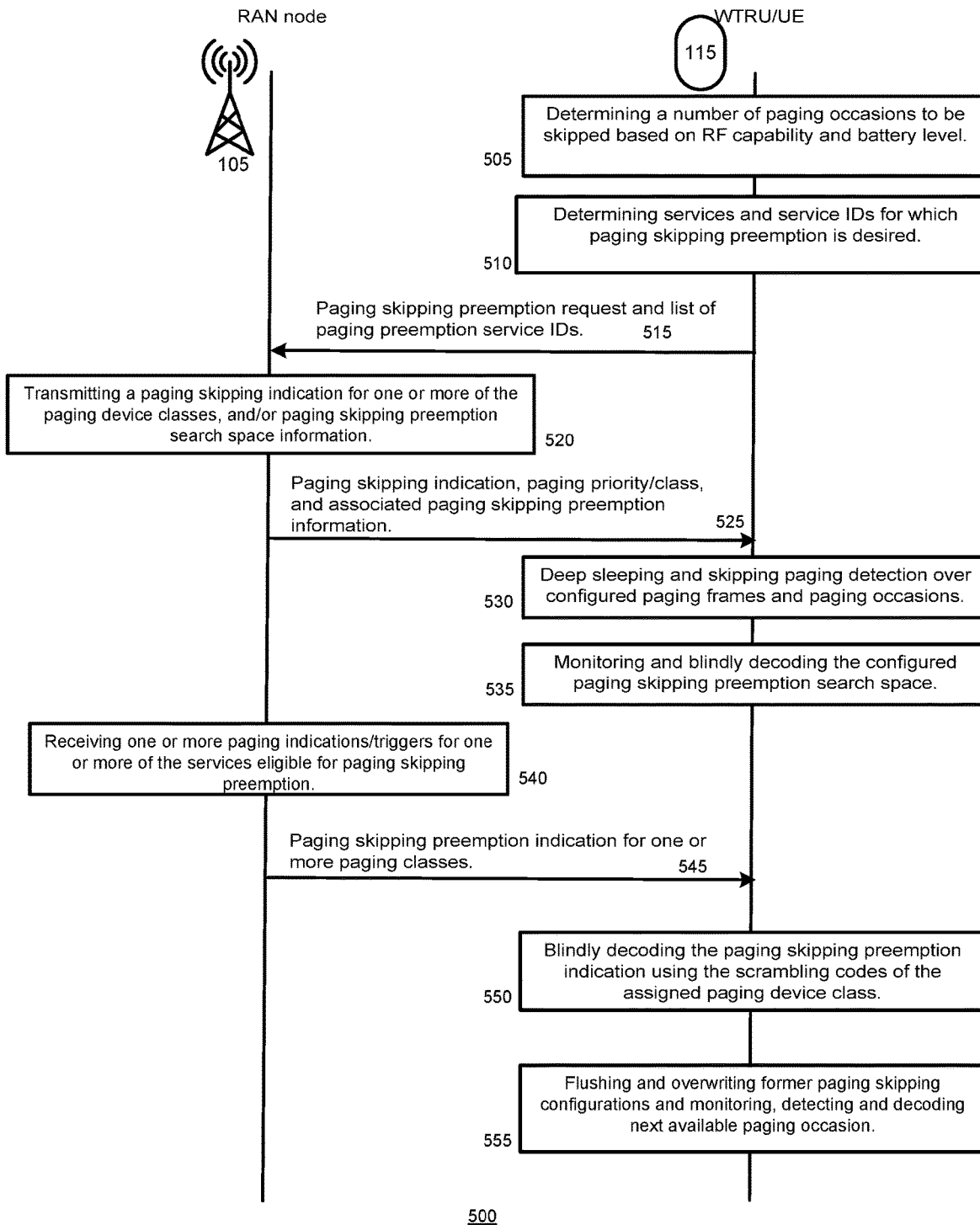
FIG. 5 illustrates a timing diagram of an embodiment method of preempting a paging skipping scheme.

Turning now to FIG. 5, the figure illustrates an example method 500 that facilitates preemption of device-class-based paging skipping based on paging-skipping preemption criteria or based on determined and configured traffic types. As discussed above, during regular/standard paging procedure (i.e., not according to the novel embodiments, concepts, features, or aspects disclosed herein), a UE connected to network A, for example, and monitoring paging resources of network B, typically monitors and decodes every paging occasion of network B, including blindly decoding EPI DCI and possibly, upon an indication that actual control information is available, blindly decoding a paging occasion corresponding to the EPI. This results in always-available paging reachability of the UE from network B but with the disadvantages discussed above that include potential premature draining of a UE's battery.

Using the paging skipping described above in reference to FIG. 3 and FIG. 4 to reduce unnecessary battery drain, for example, a UE may skip monitoring paging occasions of network B over a configured paging skipping period without impacting the overall paging performance of network B, but with reduced control channel reachability of the UE from network B. For certain paging causes/services, such as voice calls, paging skipping can mistakenly lead to a UE being seen as non-reachable in case the previously configured skipping period is larger than a call drop timer threshold, for example.

Therefore, paging preemption according to example embodiment method 500 may be used for a UE connected to network A configured to monitor paging resources of network B according to device-class-based techniques described in reference to FIG. 3 and FIG. 4 such that for certain paging causes, or paging service, the UE will not be deemed by network B as being unreachable. A list of paging skipping preemption causes/services, which me be referred to a paging skipping criteria, may correspond to a list of services of interest for which the UE can be preempted from skipping of configured paging occasions to be skipped when there is an occurrence of an available paging trigger for one or more of the causes or services indicated in the configured list of preemption causes. The UE may receive paging skipping preemption DCI/sequence information from the RAN node of network B, including paging skipping preemption resources and scrambling codes corresponding to device classes or priorities.

A UE may monitor a dedicated paging skipping preemption search space for a paging preemption indication. The dedicated paging skipping preemption search space may be configured for UEs that have been configured for device-class-based paging skipping. If there is an actual need for paging of a UE for a cause or service that is on the paging skipping preemption cause list, a preemption indication may be transmitting in the dedicated paging preemption search space for one or more of the device priorities/classes to which the UE has been classified as belonging. Upon decoding the dedicated paging skipping preemption search space, the UE may interrupt, preempt, or stop a currently configure paging skipping and monitor and decode a next available paging occasion corresponding to network B.

As discussed above, paging monitoring, detection, and decoding operations consume a significant amount of a UE's battery charge, especially when the exhibited paging false alarm rate is higher, for both single and multiple SIM devices. Without loss of generality, multi-SIM ("MUSIM") UE operations can significantly draw the stored battery charge of a handset. MUSIM UEs can either connect to multiple networks at the same time or connect to a single network while monitoring the paging of the other networks. For such case, the MUSIM UEs have to either be configured for gaps of the multiple networks or to share their RF chain capabilities to perform the MUSIM operations simultaneously. This may lead to UE performance degradation over one or more of the multiple networks as well as significant power consumption when unnecessary or insignificant RAN paging monitoring is performed.

Using existing techniques, for a multi-SIM UE connected to network A and monitoring paging occasions of network B the UE blindly decodes the early paging indication (DCI or sequence detection), blindly decodes the paging DCI, and decodes the full paging record, leading to high power use. Specifically, for MUSIM UEs, such power efficiency degradation can have a clear impact on user experience as well due to the multiple connections. For example, a UE with a latency/reliability critical QoS on network A may need to have connection gaps or reduce its RF capability (i.e., relax reliability performance) for some time until it monitors the paging occasions of the other network.

With the concepts, features, and aspects disclosed herein, paging skipping procedure, idle/inactive mode UEs can skip one or more of the paging occasions, based on their power level and type of services ongoing on the other networks in case connections gaps or capability reduction is not possible or favored. However, as described above, some RAN services may not tolerate larger paging skipping periods such as voice calls or emergency updates for sensing devices. That is, a larger paging skipping period enhances the idle/inactive mode UE power efficiency, but a larger paging skipping period also increases a UE's reachability latency, mistakenly leading to the device being deemed by the RAN as unreachable.

The paging skipping preemption techniques described herein facilitate an idle/inactive UE in determining a number of paging skipping occasions and/or duration of paging skipping as well as a list of services of which the idle/inactive UE can be preempted from paging skipping. The paging service list identifies service identifiers corresponding to services which the idle/inactive UE desires to interrupt a configured paging skipping duration in case traffic destined to the UE for one or more of those services becomes available. Accordingly, the idle/inactive UE receives the paging skipping configuration (duration of skipping, number of skipped paging occasions, assigned device class) as well as paging skipping preemption information. The latter implies information of the resources (e.g., a paging skipping preemption search space) that may potentially carry paging preemption indication. The paging skipping preemption indication can be in various forms.

A paging skipping preemption indication may be included in a downlink DCI that is scrambled according to a paging device class specific code. Thus, idle/inactive UEs may decode the paging skipping preemption search space using the code of the assigned paging device class, and on condition of a successful decoding of the paging preemption indication, idle/inactive UEs may determine that at least a single UE of the same paging device class is paged for a service during the paging skipping period and the service is one that is configured to interrupt, or preempt, paging skipping.

A paging skipping preemption indication may be indicated in a downlink sequence that is associated with one or more paging device classes. Idle/inactive UEs may detect a certain sequence and determine the paging class that is going to be paged during the current paging skipping period. On condition the UE belongs to the paged paging device class, the UE interrupts the previously configured paging skipping period and decodes the next available paging occasion.

A paging skipping preemption search space of the paging preemption indication may be of a limited size compared to the paging early indication or paging DCI. Thus, the amount of information that can be carried by the paging skipping preemption indication in a corresponding paging skipping preemption search space is similarly limited. Compared to the early paging indication design, where the information is scrambled by at least the UE group IDs, the paging preemption indication may be scrambled by paging device class identifiers that are fewer than the available UE groups and is independent from the number of idle/inactive paging UEs, thus significantly reducing the required size of the paging preemption search space.

In an embodiment, a single-Sim or multi-SIM WTRU/UE may determine a number of (or duration of paging skipping validity) paging skipping occasions to be skipped. The UE may transmit a paging skipping request and a list of paging skipping preemption service identifiers to RAN node to which the UE is connected. The UE may receive paging skipping duration and/or number of to-be-skipped paging occasions, assigned paging device class scrambling identifiers/codes, and paging skipping preemption search space information. The UE may overwrite default paging settings and subsequently skip monitoring of paging occasions that the RAN may make available during the configured paging skipping validity period. The UE may monitor and blindly decode the paging skipping preemption search space for a paging skipping preemption indication using the scrambling codes associated with a paging device class to which the UE has been assigned. On condition of the UE decoding paging skipping preemption information in the paging skipping preemption search space being directed to one or more paging device classes that the UE belongs to, the UE may flush the previously configured paging skipping pattern/ scheme, and begin/resume monitoring, decode, and receiving in a next available paging occasion, even if the UE might have skipped the next available paging occasion if the paging skipping preemption information in the paging skipping preemption search space had not included an indication that the UE monitor, decode, or detect the next available paging occasion.

Continuing discussion of FIG. 5, at step 505 UE 115 determines a number of paging occasions to skip based on RF capability, battery level, processing capability etc. as described above in reference to FIG. 3 and FIG. 4. At step 510 UE 115 may determine a list of causes/services or causes/service identifiers for which paging skipping preemption should be preempted and may transmit at step 515a request for paging skipping preemption based on the services/causes determined at step 510 to RAN 105. At step 520 RAN 105 may determine paging skipping indication information for one or more paging device classes and may determine paging skipping preemption search space information to configure UE 115 with paging skipping preemption search space opportunities. At step 525 RAN 105 may transmit to UE 115 the paging skipping indication, paging priority/class information and identifiers, and paging skipping preemption information based on the paging skipping preemption request information transmitted from the UE at step 515. At step 530 UE 115 may sleep and may skip monitoring and detection of configured paging frames and paging occasions to be skipped, which paging occasions may be skipped based on the UE's device class. At step 535 UE 115 may monitor and blindly decode the configured paging skipping preemption search space, configuration information for which it may have received in the transmission from RAN node 105 at step 525. At step 540 RAN node 105 may receive one or more paging indications, or triggers, corresponding to one or more causes, or services, of the paging skipping preemption causes information transmitted from UE 115 to the RAN node at step 515. At step 545 RAN node 105 may transmit a paging skipping preemption indication in the configured paging skipping preemption search space. At step 550 UE 115 may blindly decodes the paging skipping preemption indication in the paging skipping preemption using scrambling codes associated with the UE's device class. At step 555 UE 115 may flush, or override, the paging skipping configuration that it may have received based on the request sent at step 515, and the UE may wake up and monitor and decode the next available paging occasion. Thus, determined services, such as voice calls or emergency alert information, may be successfully transmitted to, and received by a UE, during a paging skipping period during which the UE is configured to skip paging opportunities.

Figure 6:
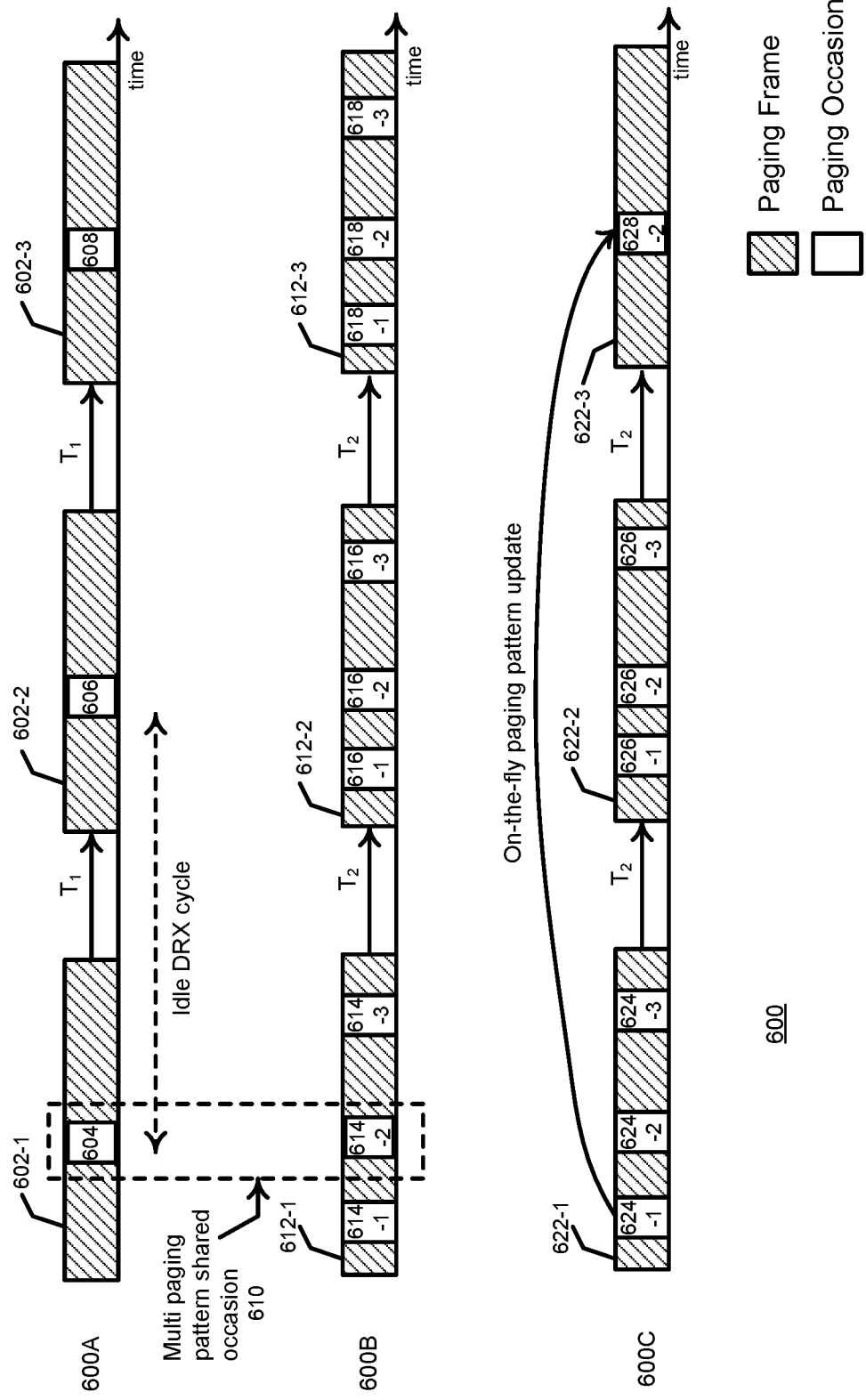
FIG. 6 illustrates a diagram of an example paging schemes with varying paging opportunities within paging frames.

Turning now to FIG. 6 illustrates three different paging patterns, or paging schemes, 600A, 600B, and 600C to show a dynamic paging adaptation embodiment. The paging patterns/schemes may be configurable by a RAN node based on the RAN node's determination of paging needs of a UE according to a device class that has been applied to the UE. The RAN node may define multiple on-the-fly paging patterns for idle/inactive UEs. A paging pattern may comprise a defined starting paging frame, a defined paging cycle, and a defined number of and placement of one or more paging occasions within the defined paging cycles for a given UE. Thus, one or more of the paging occasions can be dynamically allocated within the same UE idle/inactive DRX cycle. On condition that there is a paging pattern change indication as part of a paging DCI or a paging record for the UE, the UE may overwrite a previously set paging occasion pattern, or scheme, based on an updated pattern indication that corresponds to an identifier of the UE and paging cycle, and determining one or more paging occasions per each paging cycle, according to a paging pattern already configured in the UE, based on the paging pattern change indication received from the RAN node. Because the already configured paging patterns are already configured in the UE, the paging pattern change indication may comprise a small number of bits, or perhaps even just one bit, to indicate an already stored/configured pattern for the UE to use, thus the paging pattern change indication uses a small amount of downlink resources as compared to the amount of resources that would be used if the RAN transmitted an updated pattern to the UE instead of just a pattern indication.

Without dynamic paging adaptation, a fixed paging occasion structure within each UE idle/inactive DRX cycle, may comprise several configured paging occasions in a RAN node within a certain paging frame. However, idle/inactive UEs, without using the dynamic paging adaptation disclosed herein, can only be configured with a single paging occasion within the Idle/Inactive DRX cycle. This leads to a poor tradeoff of the idle/inactive power consumption and paging latency, and disregards various performance targets of different idle/inactive device classes.

The adaptive dynamic paging feature may facilitate low-power, low-latency paging, where multiple paging patterns are defined. A paging pattern implies a certain paging cycle (either according to cell-specific or UE-specific paging cycle configurations), a certain number of, and placement of paging occasion(s) within a UE's DRX cycle. Using the novel adaptive dynamic paging feature disclosed here, various idle/inactive UEs can be configured to monitor various paging patterns at the same time, where one or more of the pattern-specific paging occasion(s) can be shared between different patterns and UEs. The RAN node may statistically configure idle/inactive UEs with one or more paging patterns, and respective indications, using system information (e.g., SIB, or SIB2) and/or RRC signaling and/or paging-specific signaling such as the EPI, paging DCI and/or paging record. The RAN node may then dynamically configure UEs to switch from one paging pattern to another using a fast paging EPI or DCI/sequence signaling, depending on the traffic arrivals for each UE, paging capacity and resource utilization of the bandwidth part, carrying the paging indication/DCI/record. This way, idle/inactive UEs having tight latency budgets, may have multiple paging opportunities within a single DRX cycle while UEs, of a tight power capability, may have a relaxed set of the paging patterns with less frequent paging occasion frequency.

FIG. 6 illustrates a working example of the adaptive dynamic paging occasion optimization feature. Pattern 600A depicts a current paging pattern, where a single paging occasion 604, 606, and 608 occurs every cell-specific or UE-specific DRX cycle paging frame 602-1, 602-2, and 602-3, respectively, is determined based on an identifier of a UE (e.g., I-RNTI). Thus, idle/inactive UEs wake up during the determined paging occasions and monitor the paging indication, paging DCI, and/or record. Pattern 600B depicts an example where one or more idle/inactive UEs are being configured to use pattern 600B having three paging occasions 614-1, 614-2, and 614-3; 616-1, 616-2, and 616-3; and 618-1, 618-2, and 618-3 within their DRX cycle paging frames 612-1, 612-2, and 612-3, respectively, to reduce paging latency. One of the configured paging occasions, 614-1, in the first paging frame is shared with paging occasion 604 of groups of UEs of a tighter power consumption capability, which may be configured to use pattern 600A. Paging pattern 600C depicts a case where the RAN node dynamically updates the paging pattern configurations of one or more idle/inactive UEs by transmitting an updated index, or indication, of a paging pattern for the indicated UEs to switch to. In particular, the RAN node configures the indicated UE group to switch the paging monitoring to an updated paging pattern of a single paging occasion per the DRX cycle. Such a change may be useful when a UE that has been configured to use monitor three paging occasions 624-1, 624-2, and 624-3 for traffic needing a lower latency is changed to a pattern that monitors only one paging occasion 628-2 starting with paging frame 622-3 after the traffic needing the lower latency has been transmitted. Instead of transmitting an updated paging pattern to switch from monitoring three paging occasions in frame 622-1.

Figure 7:
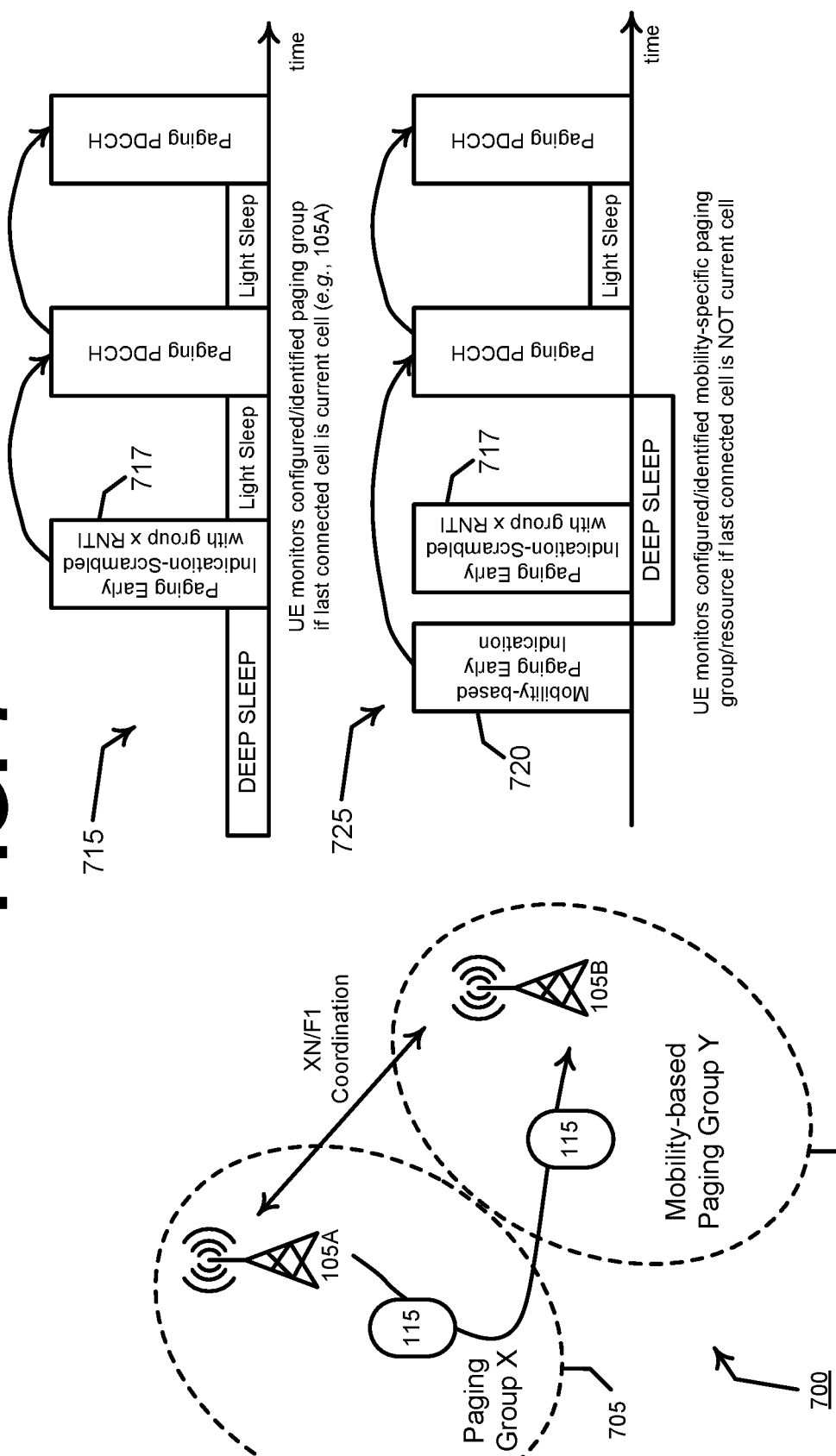
FIG. 7 illustrates diagram of an example paging schemes for monitoring paging indications from different RAM nodes.

FIG. 7 illustrates an example embodiment system 700. RAN node 105A configures idle/inactive UEs with a default paging pattern index, from a pool of a predefined paging patterns. This can be part of the periodic system information broadcast alongside the transmission of the SSBs. Upon receiving from RAN A an index, or indication, of a default paging pattern, based on an identifier of UE 115, and on condition of not being configured otherwise by lower layer signaling, idle/inactive UE 115 may overwrite identified paging frames and occasion of a paging pattern, which may have been dynamically configured as discussed in reference to FIG. 6, to revert to a standard/default paging pattern. This embodiment may be useful to frequently moving, highly mobile UEs in idle/inactive modes.

In particular, moving idle/inactive UEs, within the same RNA area, will not cause an RNA update report. Thus, when there is a paging trigger for one or more of the moved idle/inactive UEs, a paging escalation over the entire RNA may occur, which may lead to a significant increase of paging false alarms, UE power consumption, and network resource under-utilization. However, using the novel adaptive paging pattern indication feature as disclosed herein to assign a default paging pattern to moving idle/inactive UE 115, where the last selected cell 105B is not current the current RAN node cell 105A (e.g., moved to a new RAN node but never connected to it yet), the UE may monitor an indicated default paging pattern instead of a paging pattern specific to its classified paging group, or class, which pattern may have been configured based on an identifier of the UE, cell-specific or UE-specific paging cycle, etc. The indication to monitor a default paging pattern may be included in mobility-based EPI 720. Thus, when a paging escalation is experienced, the RAN node of interest, node 105B, determines that the paging indication of the default paging pattern is intended for UE 115 that did not formerly connect to node 105B, and thus assumes that the UE will be monitoring the default paging pattern 725, that includes paging opportunities connected by the arrows in FIG. 7. After receiving an indication to monitor the default paging pattern, UE 115 does not monitor the device-class-based EPI 717. Therefore, the RAN node transmits the paging indication over the default paging occasion set instead of the UE paging resources. Thus, stationary UEs (which typically are the majority devices) and their corresponding paging performance is isolated from that of the highly moving idle/inactive UEs. For example, stationary UEs monitor their own paging resources, paging cycle, or one or more of the paging patterns according to their UE identifiers/device class, while mobile UEs monitor a default paging pattern until they are configured with another other paging configuration. Accordingly, paging false alarms in low-mobility dense/urban deployments are minimized. Once a mobile idle/inactive UEs attach to the currently selected RAN node, the UEs can be configured again to monitor a defined paging pattern rather than a default paging pattern.

Figure 8:
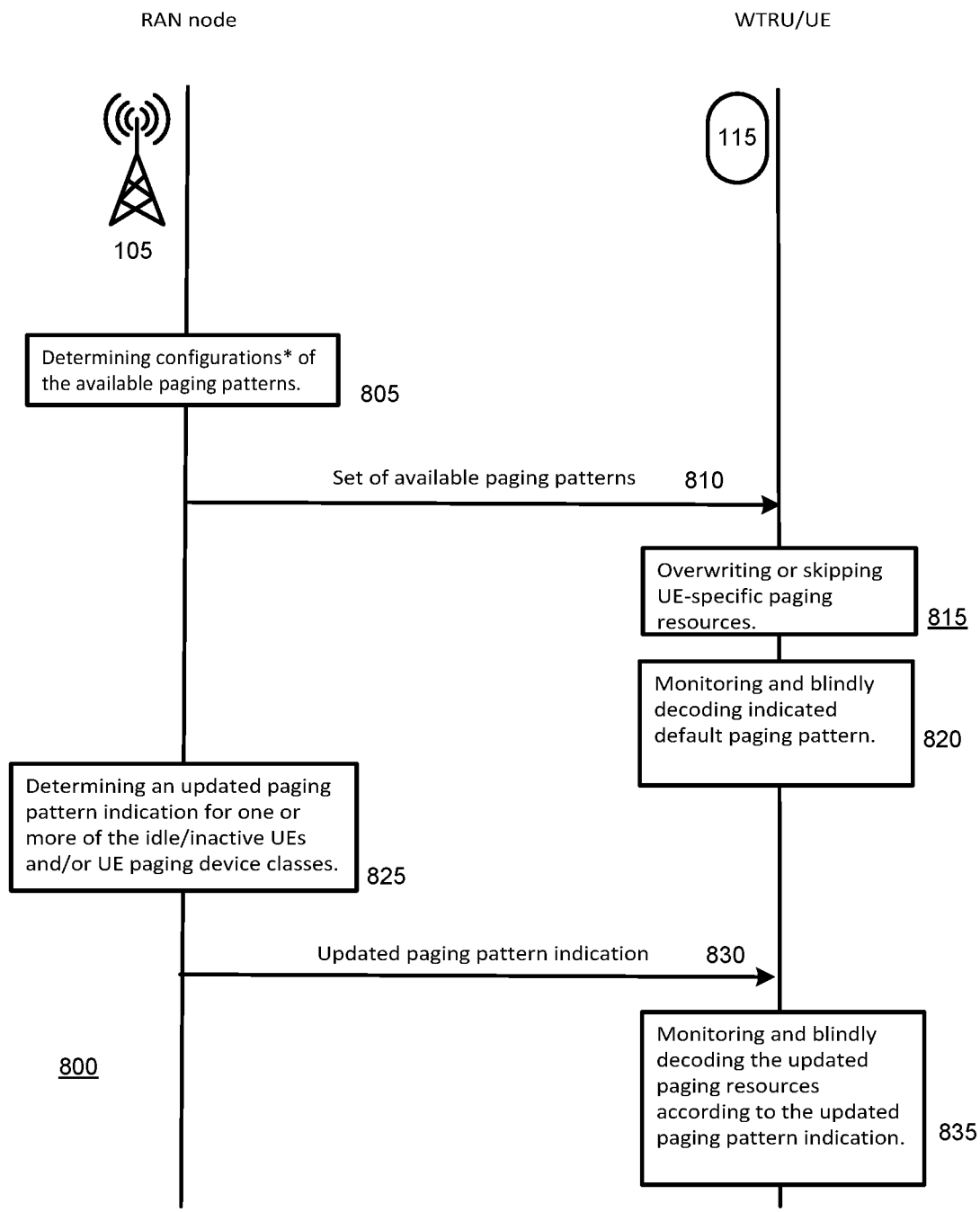
FIG. 8 illustrates a timing diagram of an example method of a RAN node changing paging patterns for a user equipment.

Turning now to FIG. 8, the figure illustrates a timing diagram of an example method 800. At step 805 RAN node 105 may determine one or more available paging pattern configurations for UE 115 and transmit the set of available paging pattern configurations at step 810. At step 815 UE 115 may overwrite or discard previously configured paging patterns, and begin monitoring and blindly decoding at step 820 one or more of the paging patterns indicated in the transmission of available paging patterns transmitted at step 810. The paging pattern(s) indicated at step 810 may comprise a default pattern to use when UE115 moves from being in an area served by a previous RAN node, such as area 705 served by RAN node 105A to area 710 served by RAN 105B as shown in FIG. 7.

Continuing with description of FIG. 8, at step 825 RAN 105 may determine an updated paging pattern indication for UE 115 and transmit the paging indication to the UE at step 830. RAN 105 may determine at step 825 updated paging patterns based on UE being determined to be stationary or to have not moved outside of an area serviced by the RAN for a determined, or configured, in-area period. At step 835 UE 115 may stop monitoring according to a paging pattern received in the transmission made at step 810 and may begin monitoring paging occasions according to a paging pattern indicated at step 830.

In an embodiment, a single-Sim or a Multi-SIM WTRU/ UE may receive configurations of available paging patterns, including the corresponding pattern indexes or identifiers, a number and placement of the paging occasion(s) withing paging frames of each paging pattern, a starting paging frame to be monitored and pattern-specific paging cycle in addition to a default paging pattern index and paging pattern validity period. On condition of receiving an indication to change paging patterns, an idle/inactive UE may overwrite previously configured paging patterns and thus skip monitoring cell-specific or UE-specific paging resources and occasions. Idle/inactive UEs may then monitor and blindly decode one or more paging occasions during the active paging pattern that the paging pattern indication caused the UE to change to. On condition of the expiry of the active paging pattern, a UE may return to monitoring and decoding of paging occasions according to a paging pattern assigned to the UE based on an identifier of the UE, according to a cell-specific paging pattern, or according to a UE-specific paging cycle.

Figure 9:
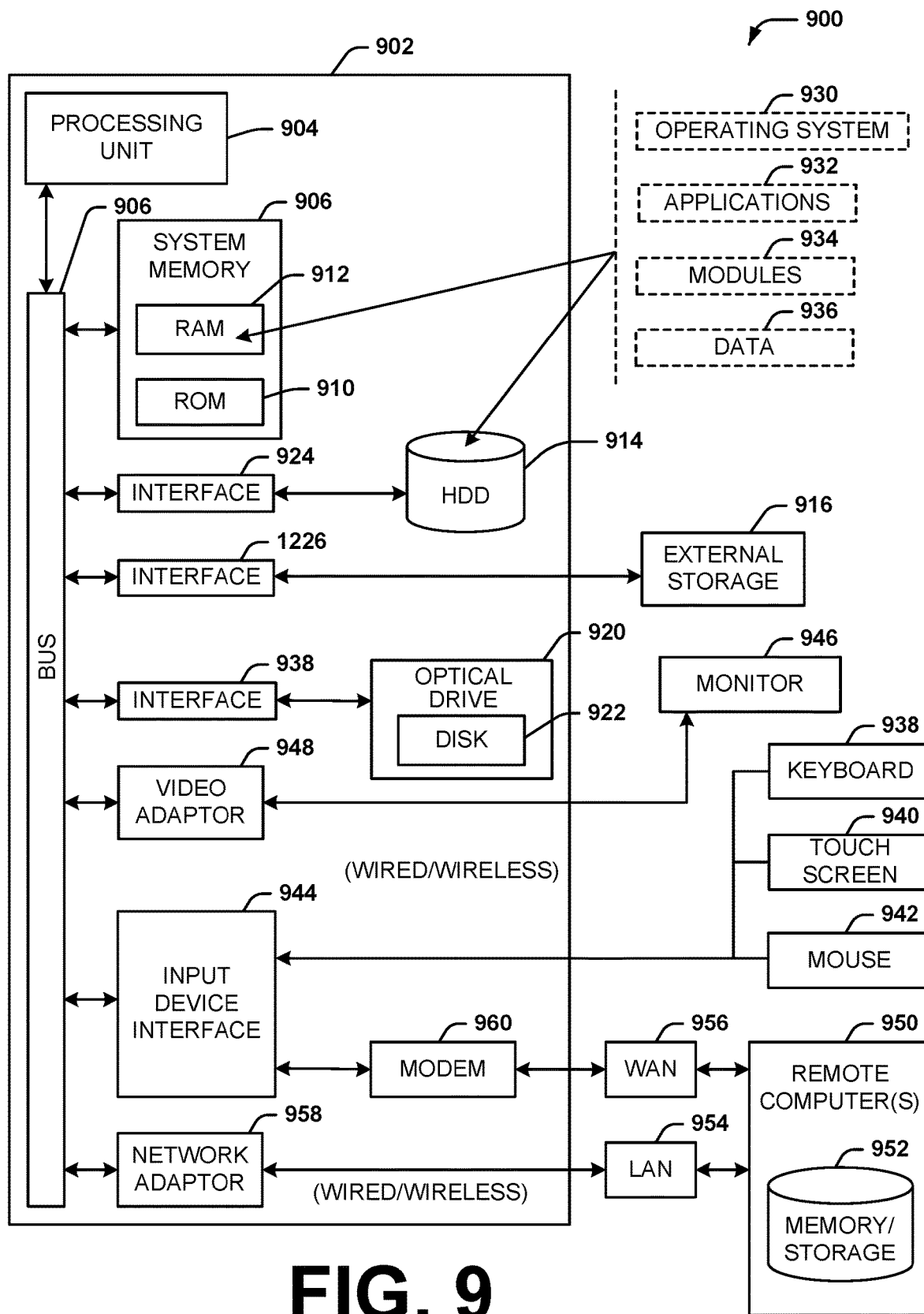
FIG. 9 illustrates an example computer environment.

In order to provide additional context for various embodiments described herein, FIG. 9 and the following discussion are intended to provide a brief, general description of a suitable computing environment 900 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors and may include a cache memory. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

Computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can comprise a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
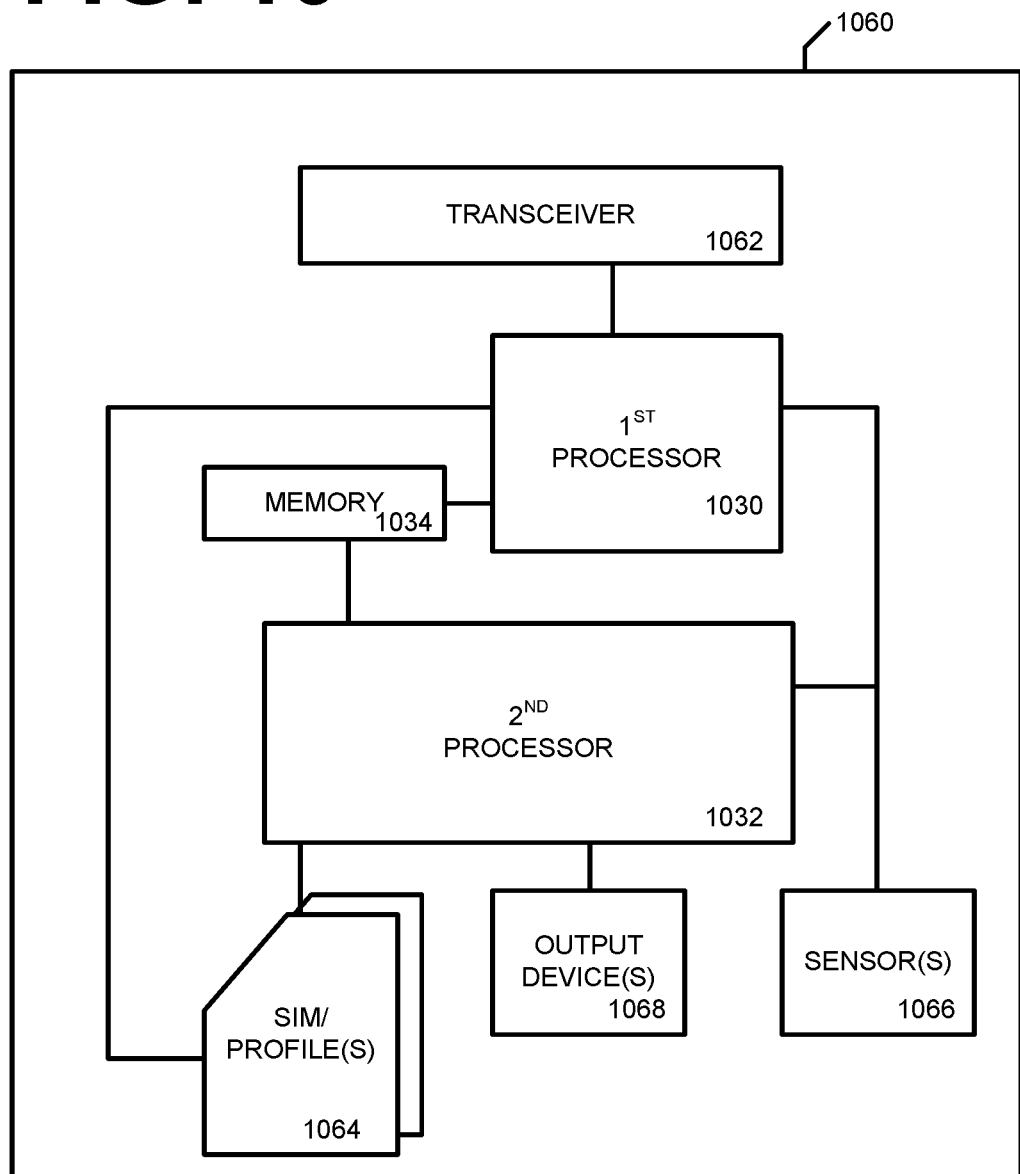
FIG. 10 illustrates a block diagram of an example wireless UE.

Turning to FIG. 10, the figure illustrates a block diagram of an example UE 1060. UE 1060 may comprise a smart phone, a wireless tablet, a laptop computer with wireless capability, a wearable device, a machine device that may facilitate vehicle telematics, and the like. UE 1060 comprises a first processor 1030, a second processor 1032, and a shared memory 1034. UE 1060 includes radio front end circuitry 1062, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1062 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 10, UE 1060 may also include a SIM 1064, or a SIM profile, which may comprise information stored in a memory (memory 34 or a separate memory portion), for facilitating wireless communication with RAN 105 or core network 130 shown in FIG. 1. FIG. 10 shows SIM 1064 as a single component in the shape of a conventional SIM card, but it will be appreciated that SIM 1064 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1064 and another device, which may be a component of RAN 105 or core network 130 shown in FIG. 1). A SIM profile 1064 may also comprise identifying information that is unique to the SIM, or SIM profile, such as, for example, an International Mobile Subscriber Identity ("IMSI") or information that may make up an IMSI.

SIM 1064 is shown coupled to both the first processor portion 1030 and the second processor portion 1032. Such an implementation may provide an advantage that first processor portion 30 may not need to request or receive information or data from SIM 1064 that second processor 1032 may request, thus eliminating the use of the first processor acting as a 'go-between' when the second processor uses information from the SIM in performing its functions and in executing applications. First processor 1030, which may be a modem processor or baseband processor, is shown smaller than processor 1032, which may be a more sophisticated application processor, to visually indicate the relative levels of sophistication (i.e., processing capability and performance) and corresponding relative levels of operating power consumption levels between the two processor portions. Keeping the second processor portion 1032 asleep/inactive/in a low power state when UE 1060 does not need it for executing applications and processing data related to an application provides an advantage of reducing power consumption when the UE only needs to use the first processor portion 1030 while in listening mode for monitoring routine configured bearer management and mobility management/maintenance procedures, or for monitoring search spaces that the UE has been configured to monitor while the second processor portion remains inactive/asleep.

UE 1060 may also include sensors 1066, such as, for example, temperature sensors, accelerometers, gyroscopes, barometers, moisture sensors, and the like that may provide signals to the first processor 1030 or second processor 1032. Output devices 1068 may comprise, for example, one or more visual displays (e.g., computer monitors, VR appliances, and the like), acoustic transducers, such as speakers or microphones, vibration components, and the like. Output devices 1068 may comprise software that interfaces with output devices, for example, visual displays, speakers, microphones, touch sensation devices, smell or taste devices, and the like, that are external to UE 1060.

Figure 11:
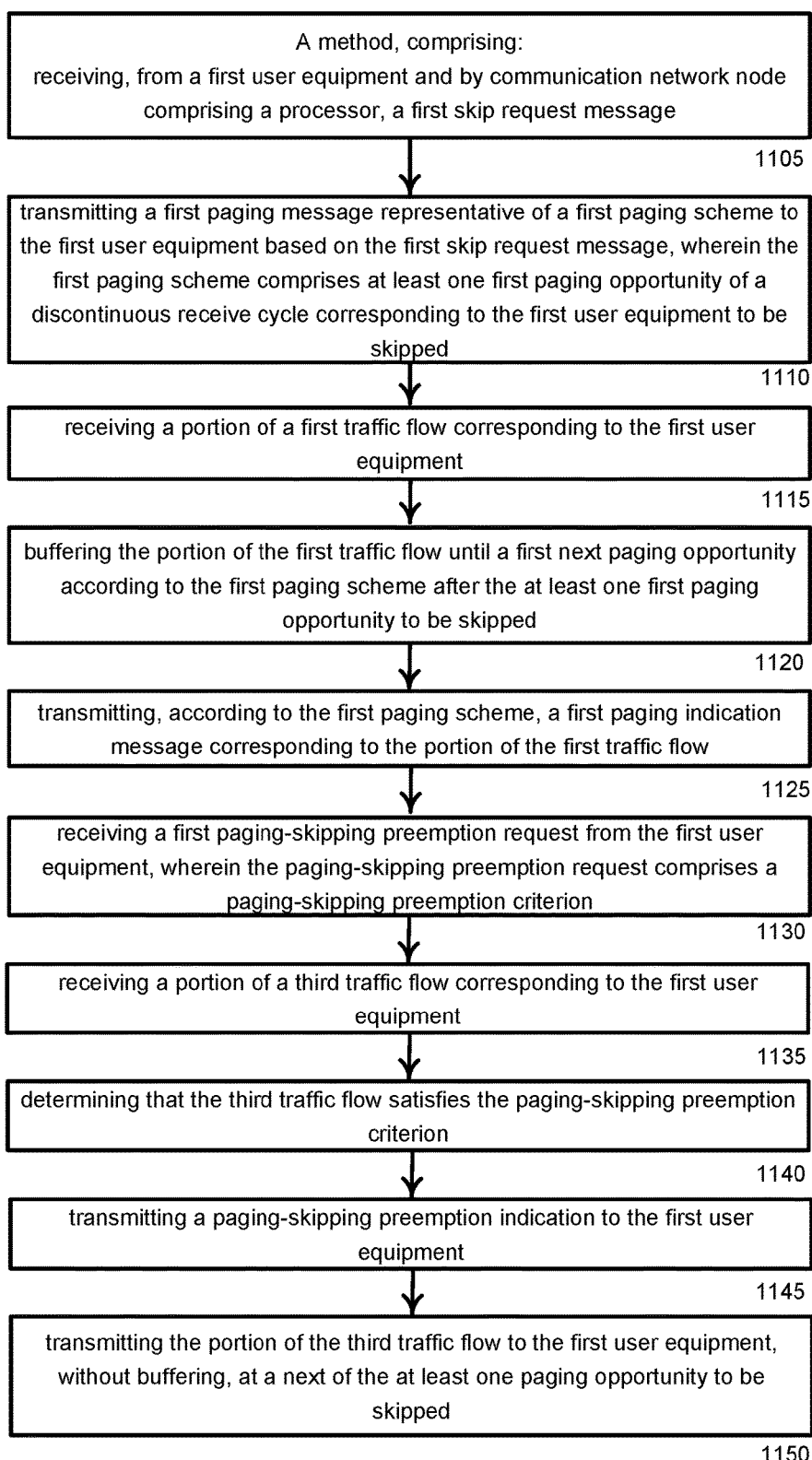
FIG. 11 illustrates a block diagram of an example method.

Turning now to FIG. 11, the figure illustrates an example embodiment method 1100 a method comprising at block 1105 receiving, from a first user equipment and by communication network node comprising a processor, a first skip request message; at block 1110 transmitting a first paging message representative of a first paging scheme to the first user equipment based on the first skip request message, wherein the first paging scheme comprises at least one first paging opportunity of a discontinuous receive cycle corresponding to the first user equipment to be skipped; at block 1115 receiving a portion of a first traffic flow corresponding to the first user equipment; at block 1120 buffering the portion of the first traffic flow until a first next paging opportunity according to the first paging scheme after the at least one first paging opportunity to be skipped; at block 1125 transmitting, according to the first paging scheme, a first paging indication message corresponding to the portion of the first traffic flow; at block 1130 receiving a first paging-skipping preemption request from the first user equipment, wherein the paging-skipping preemption request comprises a paging-skipping preemption criterion; at block 1135 receiving a portion of a third traffic flow corresponding to the first user equipment; at block 1140 determining that the third traffic flow satisfies the paging-skipping preemption criterion; at block 1145 transmitting a paging-skipping preemption indication to the first user equipment; and at block 1150 transmitting the portion of the third traffic flow to the first user equipment, without buffering, at a next of the at least one paging opportunity to be skipped.

Figure 12:
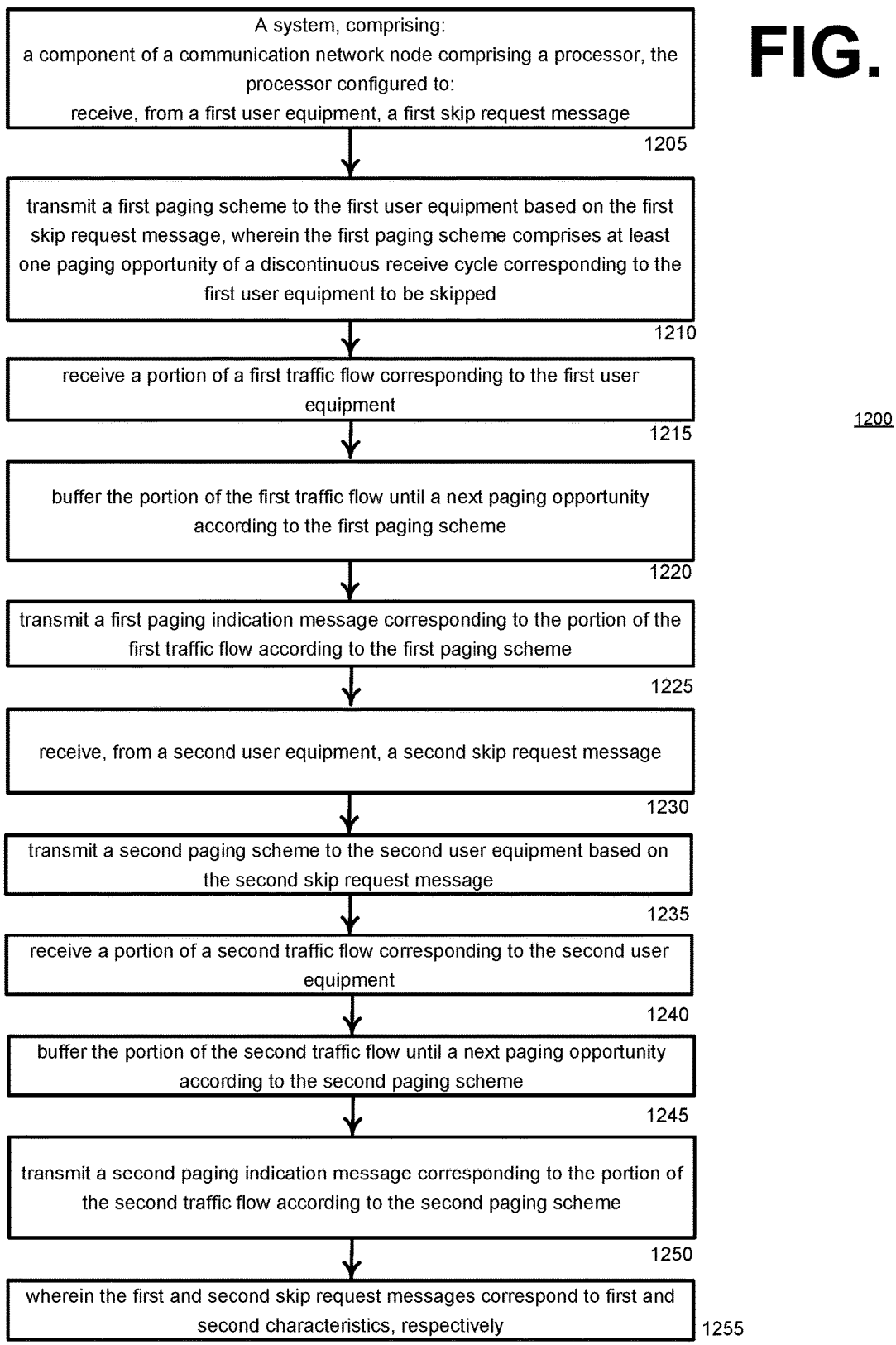
FIG. 12 illustrates a block diagram of another example method.

Turning now to FIG. 12, the figure illustrates an example method 1200 comprising at step 1205 a system, comprising a component of a communication network node comprising a processor, the processor configured to: receive, from a first user equipment, a first skip request message; at block 1210 transmit a first paging scheme to the first user equipment based on the first skip request message, wherein the first paging scheme comprises at least one paging opportunity of a discontinuous receive cycle corresponding to the first user equipment to be skipped, at block 1215 receive a portion of a first traffic flow corresponding to the first user equipment; at block 1220 buffer the portion of the first traffic flow until a next paging opportunity according to the first paging scheme; at block 1225 transmit a first paging indication message corresponding to the portion of the first traffic flow according to the first paging scheme; at block 1230 receive, from a second user equipment, a second skip request message; at block 1235 transmit a second paging scheme to the second user equipment based on the second skip request message; at block 1240 receive a portion of a second traffic flow corresponding to the second user equipment; at block 1245 buffer the portion of the second traffic flow until a next paging opportunity according to the second paging scheme; at block 1250 transmit a second paging indication message corresponding to the portion of the second traffic flow according to the second paging scheme; and at block 1250 wherein the first and second skip request messages correspond to first and second characteristics, respectively.

Figure 13:
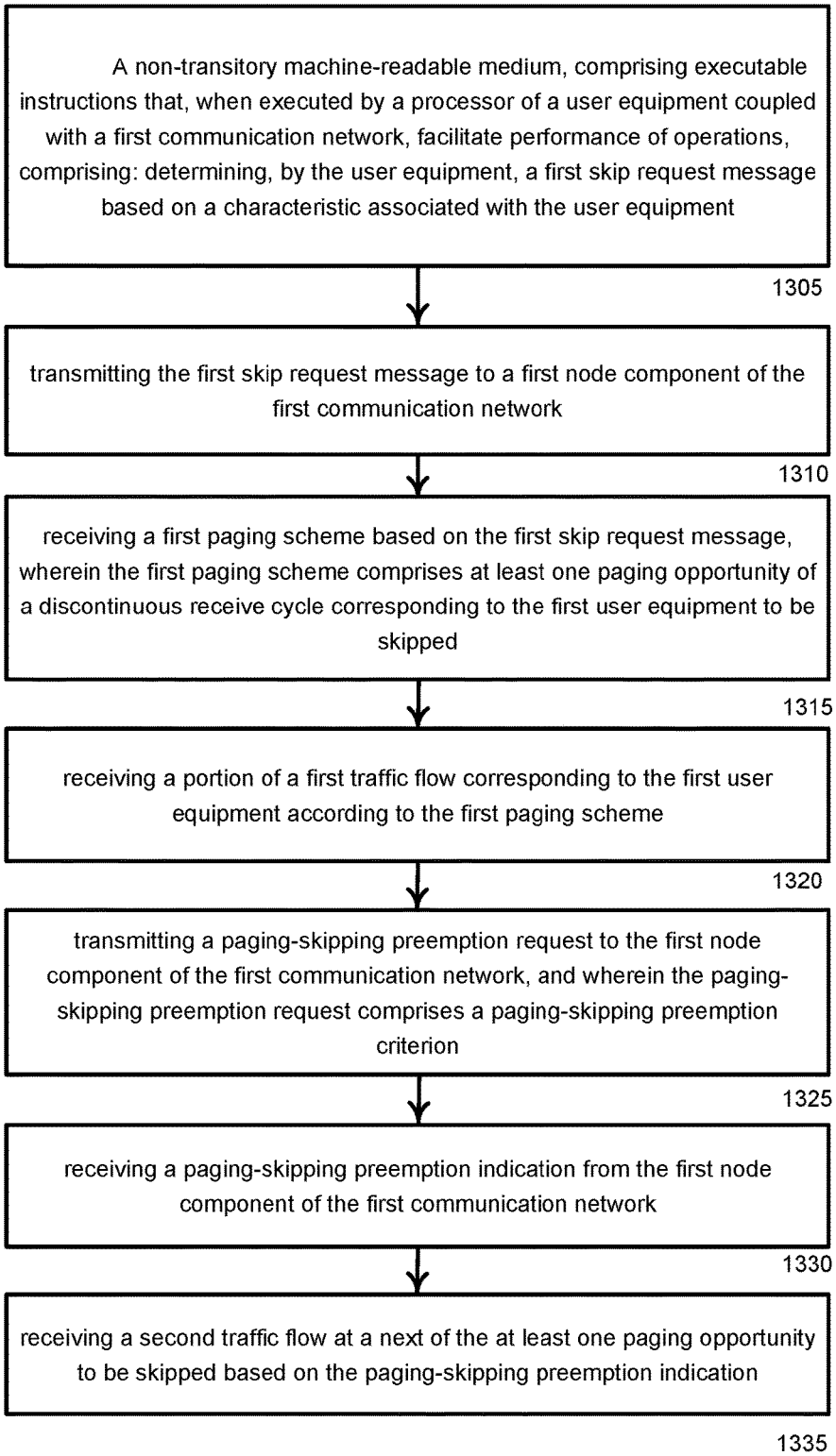
FIG. 13 illustrates a block diagram of an example non-transitory machine-readable medium.

Turning now to FIG. 13, the figure illustrates a non-transitory machine-readable medium 1300 at block 1305 executable instructions that, when executed by a processor of a user equipment that is coupled with a first communication network, facilitate performance of operations, comprising: determining, by the user equipment, a first skip request message based on a characteristic associated with the user equipment; at block 1310 transmitting the first skip request message to a first node component of the first communication network; at block 1315 receiving a first paging scheme based on the first skip request message, wherein the first paging scheme comprises at least one paging opportunity of a discontinuous receive cycle corresponding to the first user equipment to be skipped; at block 1320 receiving a portion of a first traffic flow corresponding to the first user equipment according to the first paging scheme; at block 1325 transmitting a paging-skipping preemption request to the first node component of the first communication network, and wherein the paging-skipping preemption request comprises a paging-skipping preemption criterion; at block 1330 receiving a paging-skipping preemption indication from the first node component of the first communication network; at block 1335 receiving a second traffic flow at a next of the at least one paging opportunity to be skipped based on the paging-skipping preemption indication.

Figure 14:
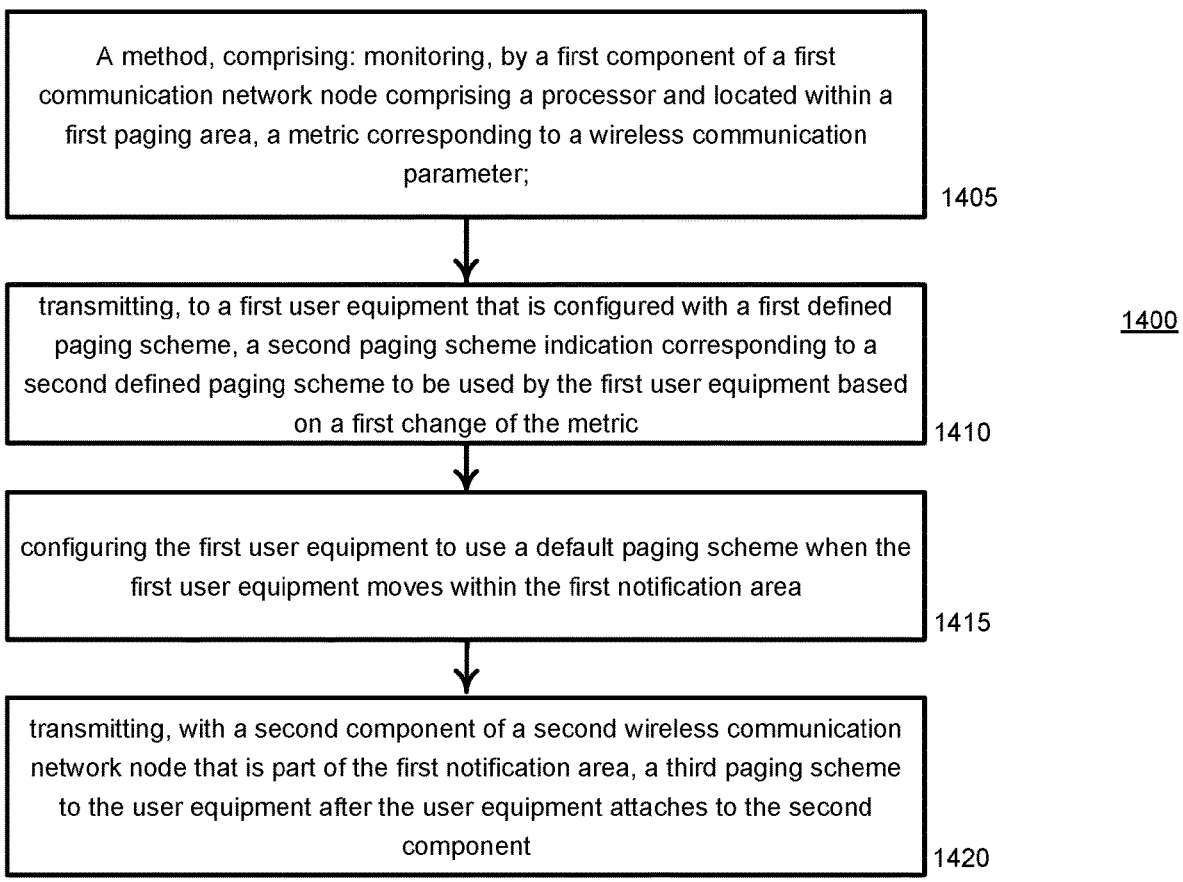
FIG. 14 illustrates a block diagram of another example method.

Turning now to FIG. 14, the figure illustrates an example embodiment method 1400 a method comprising at block 1405 a method, comprising: monitoring, by a first component of a first communication network node comprising a processor and located within a first paging area, a metric corresponding to a wireless communication parameter; at block 1410 transmitting, to a first user equipment that is configured with a first defined paging scheme, a second paging scheme indication corresponding to a second defined paging scheme to be used by the first user equipment based on a first change of the metric; at block 1415 configuring the first user equipment to use a default paging scheme when the first user equipment moves within the first notification area; and at block 1420 transmitting, with a second component of a second wireless communication network node that is part of the first notification area, a third paging scheme to the user equipment after the user equipment attaches to the second component.

Figure 15:
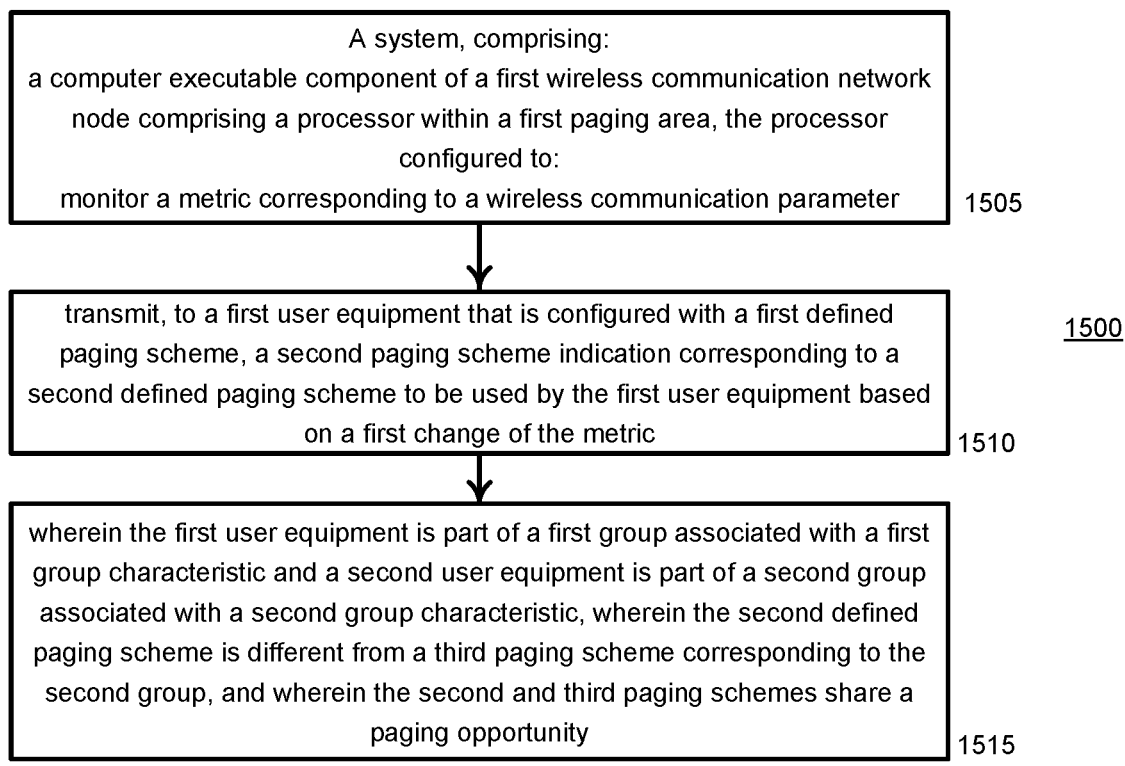
FIG. 15 illustrates a block diagram of another example method.

Turning now to FIG. 15, the figure illustrates an example method 1500 comprising at step 1505 a system, comprising a computer executable component of a first wireless communication network node comprising a processor within a first paging area, the processor configured to: monitor a metric corresponding to a wireless communication parameter; at block 1510 transmit, to a first user equipment that is configured with a first defined paging scheme, a second paging scheme indication corresponding to a second defined paging scheme to be used by the first user equipment based on a first change of the metric; at block 1515 wherein the first user equipment is part of a first group associated with a first group characteristic and a second user equipment is part of a second group associated with a second group characteristic, wherein the second defined paging scheme is different from a third paging scheme corresponding to the second group, and wherein the second and third paging schemes share a paging opportunity.

Figure 16:
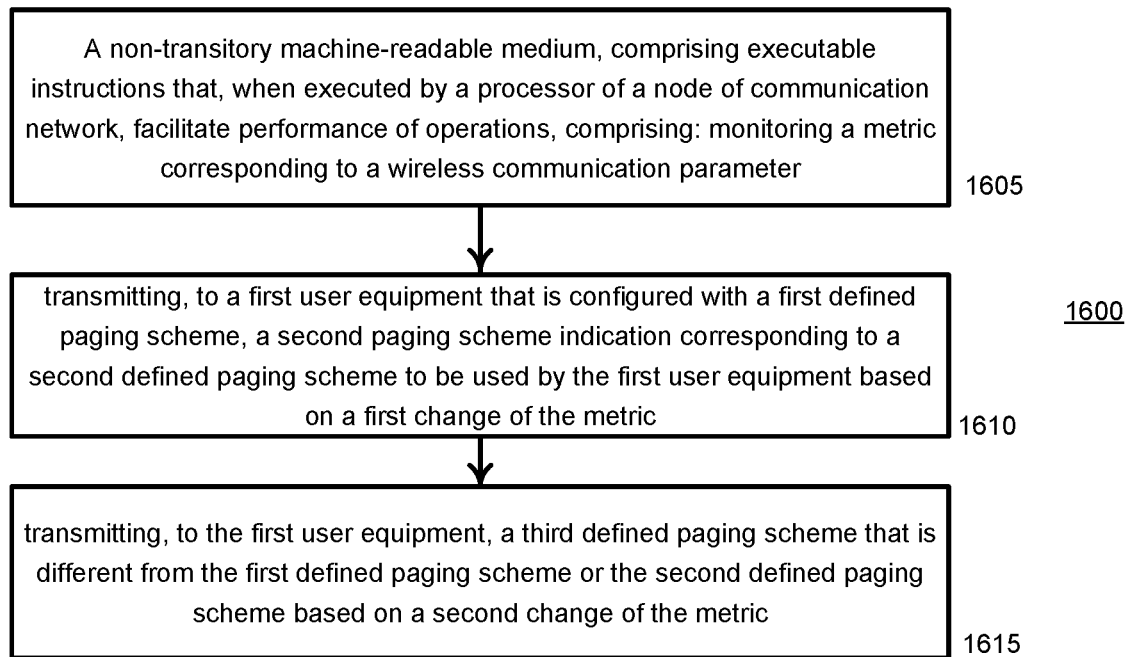
FIG. 16 illustrates a block diagram of an example non-transitory machine-readable medium.

Turning now to FIG. 16, the figure illustrates a non-transitory machine-readable medium, comprising at block 1605 executable instructions that, when executed by a processor of a node of communication network, facilitate performance of operations, comprising: monitoring a metric corresponding to a wireless communication parameter; at block 1610 transmitting, to a first user equipment that is configured with a first defined paging scheme, a second paging scheme indication corresponding to a second defined paging scheme to be used by the first user equipment based on a first change of the metric; at block 1615 transmitting, to the first user equipment, a third defined paging scheme that is different from the first defined paging scheme or the second defined paging scheme based on a second change of the metric.

The following glossary of terms given in Table 1 may apply to one or more descriptions of embodiments disclosed herein.

TABLE 1

| Term | Definition |
|------|------------|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |

TABLE 1-continued

| Term | Definition |
| --- | --- |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, from a first user equipment and by a communication network node comprising a processor, a first skip request message;
   transmitting a first paging message representative of a first paging scheme to the first user equipment based on the first skip request message, wherein the first paging scheme comprises at least one first paging opportunity of a discontinuous receive cycle corresponding to the first user equipment to be skipped;
   receiving a portion of a first traffic flow corresponding to the first user equipment;
   buffering the portion of the first traffic flow until a first next paging opportunity according to the first paging scheme after the at least one first paging opportunity to be skipped; and
   transmitting, according to the first paging scheme, a first paging indication message corresponding to the portion of the first traffic flow.

2. The method of claim 1, further comprising:
   receiving, from a second user equipment, a second skip request message;
   transmitting a first paging message representative of a second paging scheme to the second user equipment based on the second skip request message;
   receiving a portion of a second traffic flow corresponding to the second user equipment;
   buffering the portion of the second traffic flow until a second next paging opportunity after at least one second paging opportunity to be skipped according to the second paging scheme; and
   transmitting a second paging indication message corresponding to the portion of the second traffic flow according to the second paging scheme.

3. The method of claim 2, wherein the first and second skip request messages correspond to first and second characteristics, respectively.

4. The method of claim 3, wherein the first characteristic corresponds to a first Quality-of-Service requirement associated with the first user equipment and wherein the second characteristic corresponds to a second Quality-of-Service requirement associated with the second user equipment.

5. The method of claim 3, wherein the first characteristic corresponds to a first device type associated with the first user equipment and the second characteristic corresponds to a second device type associated with the second user equipment.

6. The method of claim 3, wherein the first and second characteristics correspond to different battery charge amounts of the first user equipment and the second user equipment, respectively.

7. The method of claim 2, wherein the first user equipment and the second user equipment comprise different SIM profiles of a user device.

8. The method of claim 2, wherein the first paging scheme and the second paging scheme comprise a first paging pattern and a second paging pattern, respectively, that are different from each other.

9. The method of claim 1, further comprising:
receiving a first paging-skipping preemption request from the first user equipment, wherein the paging-skipping preemption request comprises a paging-skipping preemption criterion.

10. The method of claim 9, further comprising:
receiving a portion of a third traffic flow corresponding to the first user equipment;
determining that the third traffic flow satisfies the paging-skipping preemption criterion;
transmitting a paging-skipping preemption indication to the first user equipment; and
transmitting the portion of the third traffic flow to the first user equipment, without buffering, at a next of the at least one paging opportunity to be skipped.

11. A system, comprising:
a component of a communication network node comprising a processor, the processor configured to:
receive, from a first user equipment, a first skip request message;
transmit a first paging scheme to the first user equipment based on the first skip request message, wherein the first paging scheme comprises at least one paging opportunity of a discontinuous receive cycle corresponding to the first user equipment to be skipped;
receive a portion of a first traffic flow corresponding to the first user equipment;
buffer the portion of the first traffic flow until a next paging opportunity according to the first paging scheme; and
transmit a first paging indication message corresponding to the portion of the first traffic flow according to the first paging scheme.

12. The system of claim 11, the processor further configured to:
receive, from a second user equipment, a second skip request message;
transmit a second paging scheme to the second user equipment based on the second skip request message;
receive a portion of a second traffic flow corresponding to the second user equipment;
buffer the portion of the second traffic flow until a next paging opportunity according to the second paging scheme; and
transmit a second paging indication message corresponding to the portion of the second traffic flow according to the second paging scheme.

13. The system of claim 12 wherein the first and second skip request messages correspond to first and second characteristics, respectively.

14. The system of claim 11, the processor further configured to receive a first paging-skipping preemption request from the first user equipment, wherein the paging-skipping preemption request comprises a paging-skipping preemption criterion.

15. The system of claim 14, the processor further configured to:
receive a portion of a third traffic flow corresponding to the first user equipment;
determine that the third traffic flow satisfies the paging-skipping preemption criterion;
transmit a paging-skipping preemption indication to the first user equipment; and
transmit the portion of the third traffic flow to the first user equipment, without buffering, at a next of the at least one paging opportunity to be skipped.

16. A non-transitory machine-readable medium, comprising executable instructions that, when executed by a processor of a user equipment coupled with a first communication network, facilitate performance of operations, comprising:
determining, by the user equipment, a first skip request message based on a characteristic associated with the user equipment;
transmitting the first skip request message to a first node component of the first communication network;
receiving a first paging scheme based on the first skip request message, wherein the first paging scheme comprises at least one paging opportunity of a discontinuous receive cycle corresponding to the first user equipment to be skipped; and
receiving a portion of a first traffic flow corresponding to the first user equipment according to the first paging scheme.

17. The non-transitory machine-readable medium of claim 16, wherein the characteristic corresponds to a Quality-of-Service requirement associated with the user equipment.

18. The non-transitory machine-readable medium of claim 16, wherein the user equipment is configured to communication with the first node component of the first communication network and a node component of a second node component of a second communication network, and wherein the at least one paging opportunity of the discontinuous receive cycle corresponding to the first user equipment to be skipped is associated with the second communication network.

19. The non-transitory machine-readable medium of claim 16, wherein the operations further comprise transmitting a paging-skipping preemption request to the first node component of the first communication network, and wherein the paging-skipping preemption request comprises a paging-skipping preemption criterion.

20. The non-transitory machine-readable medium of claim 19, wherein the operations further comprise:
receiving a paging-skipping preemption indication from the first node component of the first communication network; and receiving a second traffic flow at a next of the at least one paging opportunity to be skipped based on the paging-skipping preemption indication.

\* \* \* \* \*